United States Patent
Edelman et al.

(10) Patent No.: US 12,017,865 B2
(45) Date of Patent: Jun. 25, 2024

(54) ENCLOSED HOPPER-CONTAINER DISPENSING MECHANISM

(71) Applicant: KSi Conveyor, Inc., Sabetha, KS (US)

(72) Inventors: Matthew J. Edelman, Sabetha, KS (US); Dominic E. Meyer, Sabetha, KS (US); Jason P. Kaeb, Sabetha, KS (US)

(73) Assignee: KSI Conveyor, Inc., Sabetha, KS (US)

( * ) Notice: Subject to any disclaimer, the term of this patent is extended or adjusted under 35 U.S.C. 154(b) by 234 days.

(21) Appl. No.: 17/805,582

(22) Filed: Jun. 6, 2022

(65) Prior Publication Data

US 2022/0396433 A1    Dec. 15, 2022

Related U.S. Application Data

(60) Provisional application No. 63/202,431, filed on Jun. 10, 2021.

(51) Int. Cl.
*B65G 47/04* (2006.01)

(52) U.S. Cl.
CPC .................... *B65G 47/04* (2013.01)

(58) Field of Classification Search
CPC ................ B65G 47/04; B65G 65/23
See application file for complete search history.

(56) References Cited

U.S. PATENT DOCUMENTS

| | | | |
|---|---|---|---|
| 4,953,262 A * | 9/1990 | Zinser | A22C 11/00 254/3 R |
| 5,944,470 A * | 8/1999 | Bonerb | B65G 65/23 222/166 |
| 9,089,147 B2 * | 7/2015 | Maile | B65G 65/23 |
| 2004/0060367 A1 | 4/2004 | Bergman et al. | |
| 2007/0172339 A1 | 7/2007 | Forest et al. | |
| 2008/0029546 A1 | 2/2008 | Schuld | |

(Continued)

FOREIGN PATENT DOCUMENTS

JP    3096742 B2    10/2000

OTHER PUBLICATIONS

Basco, Morse, Steel Cone Top Aluminum Iris Valve (55SDCSI), OpenTip, Published at least as early as Apr. 27, 2021, 4 pages, United States.

(Continued)

*Primary Examiner* — Donnell A Long
(74) *Attorney, Agent, or Firm* — Coughlin Law Office LLC; Daniel J. Coughlin; Stuart M. Aller

(57) ABSTRACT

A dispensing mechanism having an engagement device, a valve assembly, and an actuator. The engagement device can receive a container on a stand. The actuator can be mounted to the stand to move the stand in an axis parallel to a height of the container. The engagement device moves the container between a load position and a sealed position. A rim of the container abuts a sealing member of the valve assembly in the sealed position. The dispensing mechanism is pivotally mounted to the hopper. The dispensing mechanism and container are movable together between two positions: the load position, where the valve assembly operates as a lid for the container; and a dispense position, where the valve assembly operates as a lid for the hopper. A valve of the valve assembly is opened to discharge a product from the container while in the dispense position.

20 Claims, 19 Drawing Sheets

(56) References Cited

U.S. PATENT DOCUMENTS

2009/0008410 A1   1/2009  Kosich
2017/0274331 A1   9/2017  Edelman et al.
2018/0031163 A1   2/2018  Ganzer et al.

OTHER PUBLICATIONS

Ensign Equipment Inc., Bag Dump Station, Manual, Published as early as Nov. 2017, 2 pages, Ensign Equipment, Holland, Michigan, United States.

Kemutec USA, Mucon JS Series Iris Diaphragm Valve, Bulk Bag Discharge Control, Published on YouTube on Oct. 31, 2013 at https://www.youtube.com/watch?v=QFwJfybSSBY, 4 pages, Kemutec Group Inc., United States.

Vortex, Quantum Series Iris Valve, Published at least as early as May 17, 2022, 6 pages, Salina Vortex Corporation, United States.

富山 et al., Granule transport system, This is a machine translation of a foreign patent originally published on Oct. 10, 2000, 7 pages, JP3096742B2, Japanese Patent Office, Japan.

* cited by examiner

Section A-A

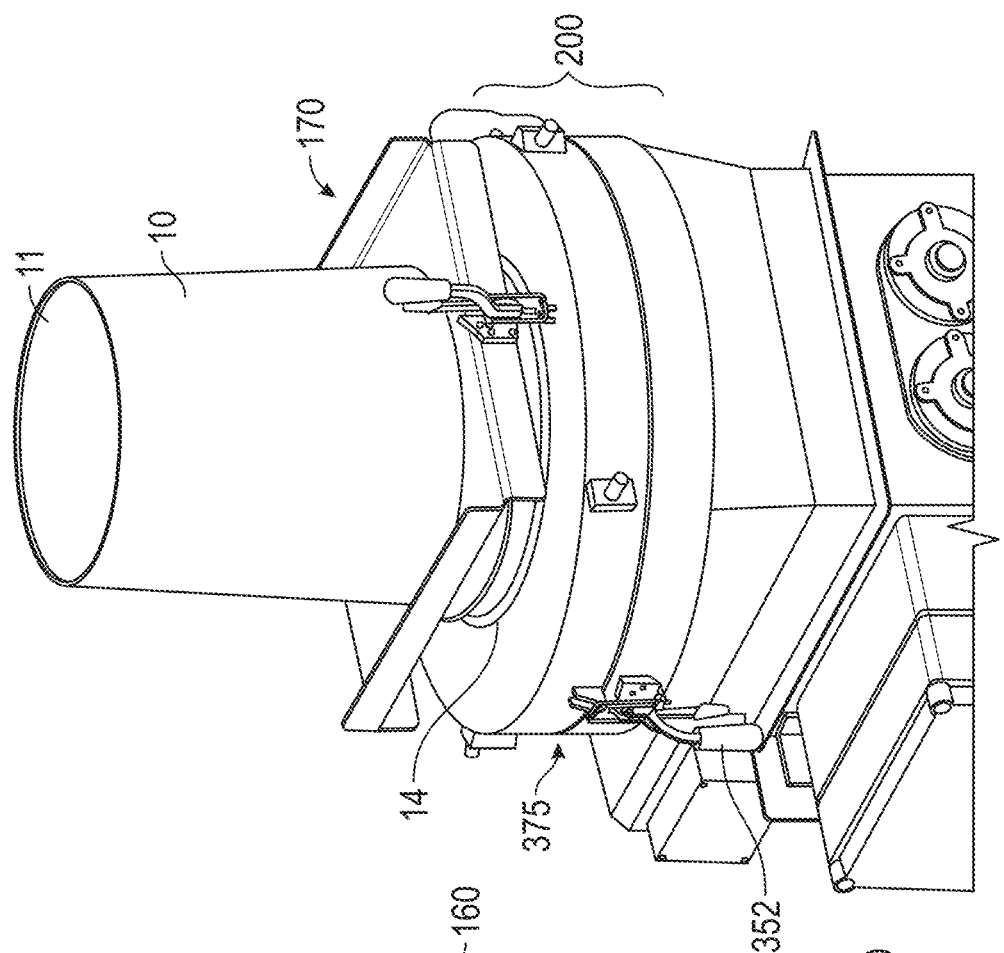
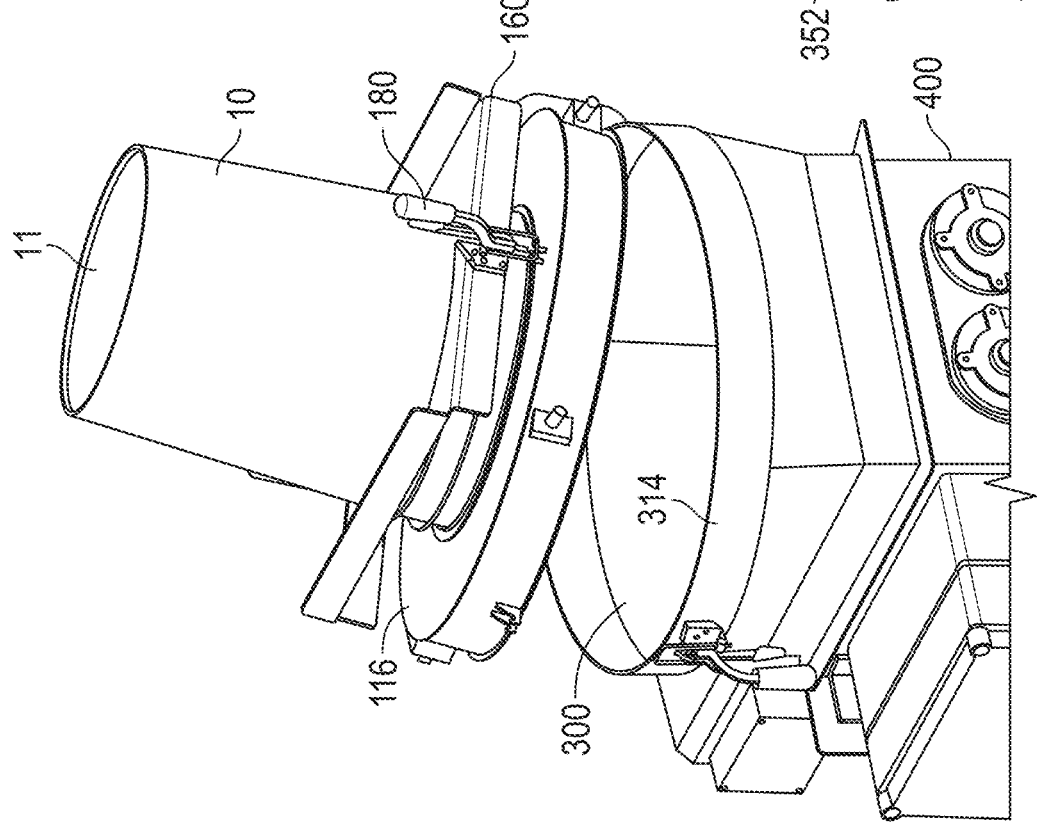

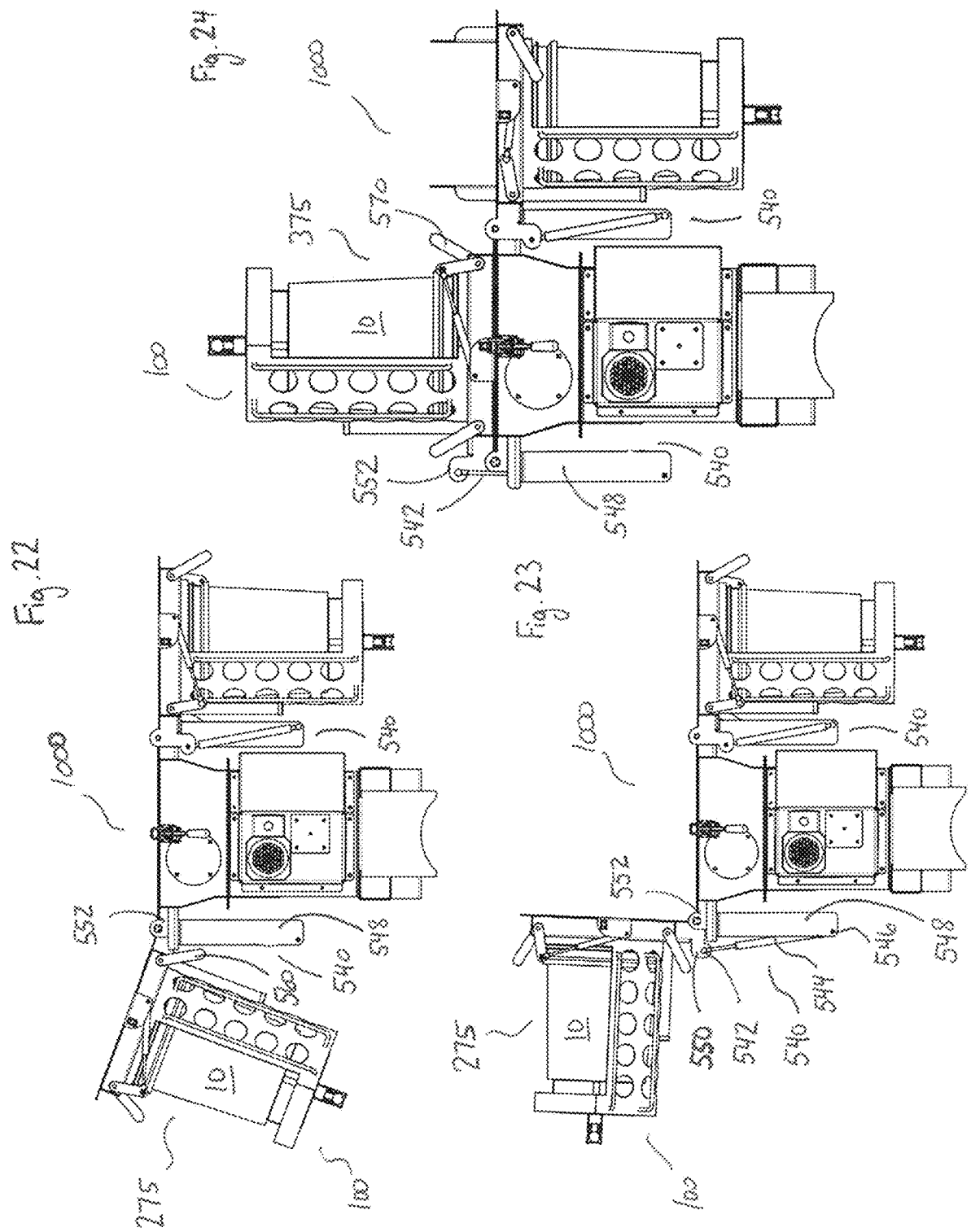

ENCLOSED HOPPER-CONTAINER DISPENSING MECHANISM

CROSS REFERENCES

This application claims priority of U.S. Provisional Application No. 63/202,431 filed 10 Jun. 2021.

FIELD OF THE INVENTION

The present disclosure relates to a dispensing mechanism that facilitates closure of an open container and assists movement of the container into a discharge position for release of fluent materials into a dry feeder of a conveyor through an aperture maintained within a sealed environment formed by the dispensing mechanism with a hopper.

BACKGROUND

Many seed treatment products, such as dry additives, are packaged and sold to seed treatment operators in high-density polyethylene buckets having capacities such as five-gallon buckets often having a lid. Seed treatment operators open and tip the bucket to dispense the seed treatment product into a hopper or an opening in a receiver, such as a dry additive feeder, joined to a seed conveyor. For example, the seed treatment may be a dry agrochemical additive, or other fluent seed treatment, such as powdered talc, graphite, seed shiner or polisher.

A dry additive feeder allows for even dispensing of a metered quantity of powder. A hopper holds the powder. The hopper has a mixing portion with rotating beaters. A horizontal conduit is coupled to the hopper and receives powder from the hopper. A screw conveyor—or auger—within the conduit transfers the material through the horizontal conduit to the seed conveyor.

SUMMARY

A dispensing mechanism has a valve assembly that joins with a hopper. The valve assembly receives a container. The valve assembly is movable between two positions: a load position, where the valve assembly operates as a lid for the container; and a dispense position, where the valve assembly operates as a lid for the hopper. An engagement device of the dispensing mechanism receives a container. An actuator of the dispensing mechanism is mounted between the valve assembly and the engagement device. The actuator can move the engagement device, and thus the container, between an unsealed position and a sealed position.

The engagement device may move in an axis parallel to a height of the container received by the engagement device. The engagement device may move away from the valve assembly to receive the container in an unsealed position and move towards the valve assembly to seal the container in a sealed position. The valve assembly may be pivotally mounted to the hopper. A hinge may be attached between a valve casing of the valve assembly and the hopper. The hinge can pivot the dispensing mechanism and the container between the load position and the dispense position. A plurality of dispensing mechanisms can operate with the hopper and be movable between the load position and the dispense position, sequentially or simultaneously. The valve assembly may move relative to the hopper, where the valve assembly is adjacent to the hopper in the load position and above the hopper in a dispense position. The valve assembly may have a first side and a second side. The first side may receive a rim of the container. The second side may join with the hopper to form an enclosure. An aperture may be disposed through the first side and the second side. The aperture may be the same size as an opening of the container. A valve may close and open the aperture. The aperture may be disposed within an interior perimeter of a rim seat. The rim seat may be disposed above the container in the load position and disposed below the container in the dispense position. The valve may be disposed above the rim seat in the load position and seated below the rim seat in the dispense position. In the dispense position, the valve can be disposed between the rim seat and the hopper. A sealing member of the valve assembly may or may not have the rim seat. The sealing member is movable between two positions: a load position, where the sealing member is adjacent to the hopper; and a dispense position, where the sealing member is above the hopper. A flange may be disposed at a perimeter of the sealing member or the valve casing. The flange may form an enclosure with the hopper in the dispense position.

A product, such as a fluent material, is dispensed from the container by the dispensing mechanism. The container, having an opening, is loaded into the dispensing mechanism. The opening of the container is sealed by the dispensing mechanism. The dispensing mechanism and container are inverted. Then the dispensing mechanism is joined to a hopper to form an enclosure.

Additional steps may be included for dispensing a product from the container with the dispensing mechanism. The container is maintained in a sealed state during the steps of inverting and joining. The valve of the dispensing mechanism is then opened to empty the product from the container through the enclosure to the hopper.

BRIEF DESCRIPTION OF DRAWINGS

Aspects are illustrated by way of example, and not by way of limitation, in the accompanying drawings, wherein:

FIG. 10 shows a top-side perspective view of the hopper-container arrangement of FIG. 8 displaying the dispensing mechanism and the container in a pivoted position.

FIG. 11 shows a top-side perspective view of the hopper-container arrangement of FIG. 8 displaying the dispensing mechanism and the container in a dispense position.

FIG. 22 shows a side view of a hopper-container arrangement with a dispensing mechanism in a sealed position moving with assistance.

FIG. 23 shows the dispensing mechanism of FIG. 22 nearing the dispense position.

FIG. 24 shows the dispensing mechanism of FIG. 23 forming an enclosure in the dispense position.

DETAILED DESCRIPTION

Figure 1:
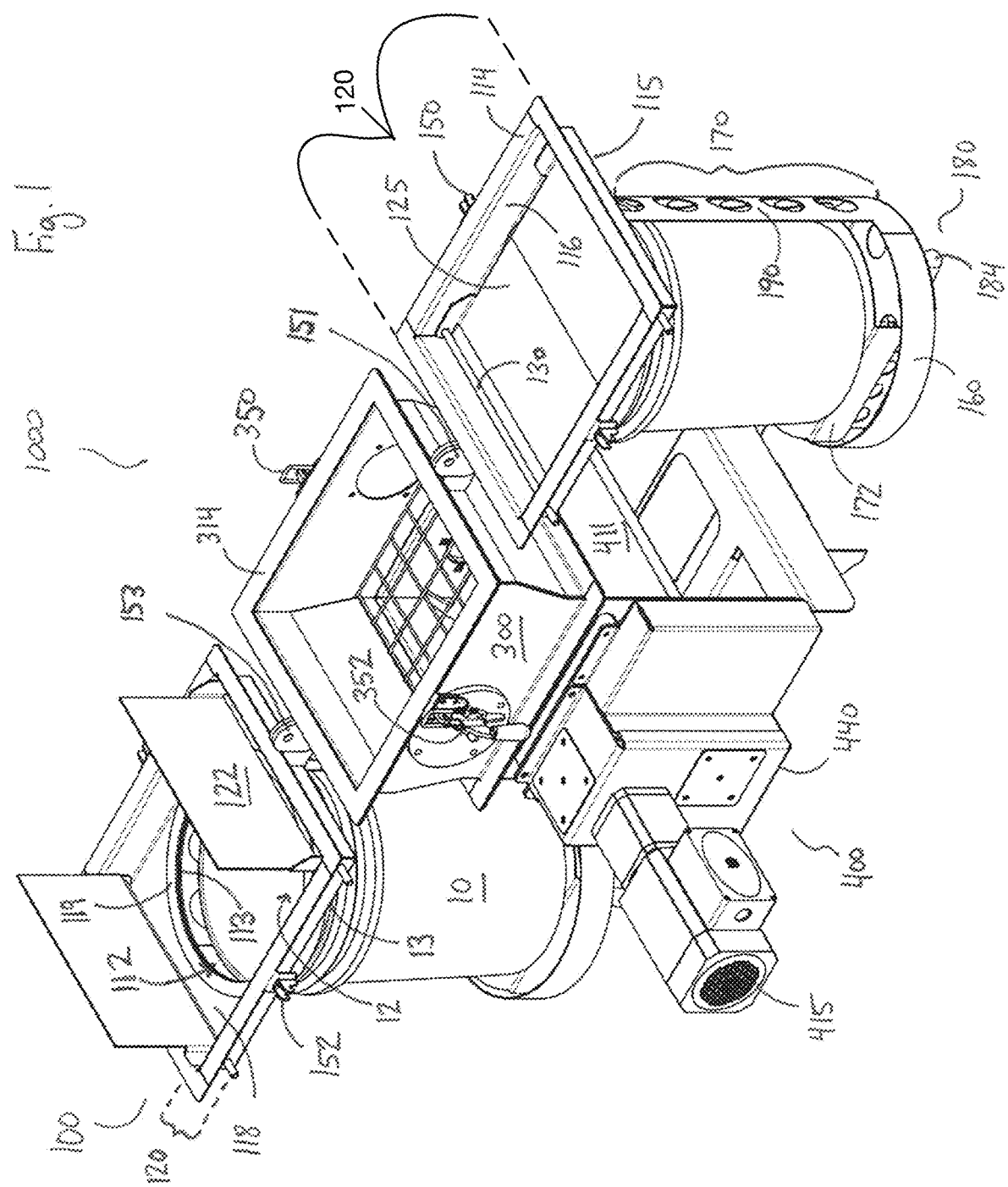
FIG. 1 shows a top-side perspective view of a hopper-container arrangement with one version of dispensing mechanisms in a load position.

A dispensing mechanism for dispensing the contents of one or more containers into a hopper is generally shown in FIG. 1. Joining the dispensing mechanism with a hopper, hereinafter referred to as a "hopper-container dispensing mechanism", forms an enclosure therebetween. The dispensing mechanism serves as a lid for the container in the sealed position. In a dispense position, the dispensing mechanism serves as a lid for the hopper and becomes the floor of the container. Product dispensed from the container flows through the dispensing mechanism into an enclosure. The hopper-container dispensing mechanism may reduce or prevent dusting and contamination of a surrounding environment when product is released from a container into a hopper. Therefore, the enclosed hopper-container dispensing mechanism may limit or prevent exposing an operator to dust off. Specifically, an enclosed hopper-container dispensing mechanism may be used with a dry additive feed mixer (dry feeder) for transferring seed treatment from the container to the seed conveyor in a seed treatment system. Alternatively, the dispensing mechanism may be mounted adjacent to an inlet of the conveyor for direct discharge of seed treatment into the stream of seed passing through the conveyor. Optionally, the hopper-container dispensing mechanism may be mounted directly to a powered auger dispensing unit for use in powder packaging by filling machines.

The dispensing mechanism maintains the product in an enclosed environment. The product is maintained in an enclosed environment from a start point where an open end of the container is engaged with the dispensing mechanism and an end point where the product is released from the container into a hopper. The dispensing mechanism includes a valve assembly that maintains the container in an enclosed, sealed position during movement of the dispensing mechanism and the container from a load position to the dispense position, and vice versa. In the dispense position, the valve assembly forms an enclosure with the hopper to enclose the dry additive (or some other product) as it is released from the container.

To form a seal between the container and the valve assembly, the valve assembly may contain a first sealable surface. The container actuator or other securing device moves the container or the valve assembly to form a seal between the valve assembly and the container. Optionally, an engagement device may cooperate with the container actuator to move the container. The container engagement device and valve assembly may stably rest upon a hopper when in a dispense position. As previously mentioned, the arrangement may be directly mounted to a powered auger dispensing unit, a conveyor, a seed treater, or other powder treatment system.

As shown in FIG. 1, a diagram illustrates a front perspective view of the hopper-container dispensing mechanism 1000. As shown, the hopper-container dispensing mechanism 1000 includes a dispensing mechanism 100, and a hopper 300. A bottom end of the hopper 300 is attached to a dry additive feeder 400. The hopper-container dispensing mechanism 1000 allows a container 10 to be loaded, or engaged, with the dispensing mechanism 100. Dispensing mechanism 100 has an engagement device 170 that is configured to receive a container 10. A container actuator 180 (seen more clearly in FIG. 7) is mounted to the engagement device 170. A plurality of container actuators may be mounted to the engagement device 170. A valve assembly 120 is mounted to the engagement device opposite the container actuator 180. The container actuator 180 may also be mounted to another portion of the engagement device 170 or valve assembly 120. The container actuator 180 moves the product stand 172 and/or the container 10 towards and away from the valve assembly 120 along an axis ($\alpha$) (shown in FIGS. 4 and 6) parallel with the height of the container 10. The hopper-container dispensing mechanism 1000 may include a dry additive feeder 400 attached to the bottom end of the hopper 300.

The dispensing mechanism 100 may be attached to the hopper 300 with a hinge 151, 153 (pivot) that provides for connection and movement of the dispensing mechanism 100. The dispensing mechanism 100 may be swung up and over the pivot point of the hinge 151, 153. The hopper 300 may have an opening facing upwards or angled to a side. The dispensing mechanism 100 may move between a load position 175, adjacent to the hopper 300, and a dispense position 375, above or to a side of the hopper 300. The dispensing mechanism 100 may be moved with an actuator to move the dispensing mechanism 100 from the load position 175 to the dispense position 375, and vice versa. The actuator may be operated manually or automatically. The actuator may be configured as an operator assist, where the actuator operates upon manually starting to move the dispensing mechanism 100. The actuator may be activated via hardwire or wireless links, such as Bluetooth, Infrared, or barcode scanning. A pneumatic or hydraulic cylinder or a plurality of pneumatic or hydraulic cylinders may be remotely linked to assist movement of the dispensing mechanism 100 between the load position 175 and the dispense position 375. When the dispensing mechanism 100 is moved into the dispense position, an enclosure 200 may be formed between a valve assembly 120 of the dispensing mechanism 100 and a hopper 300 of the dry additive feeder 400.

Figure 4:
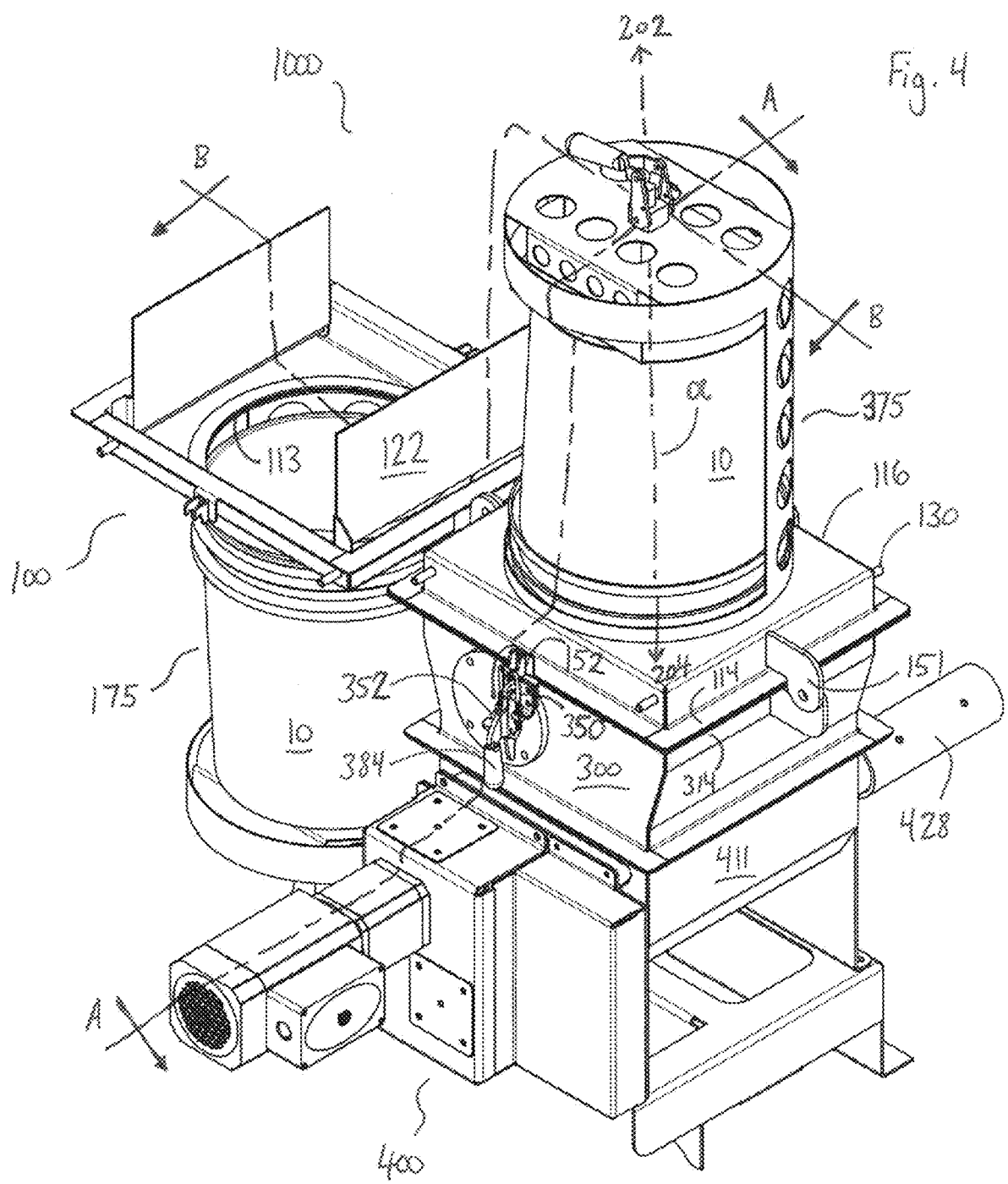
FIG. 4 shows a top-side perspective view of FIG. 3.

The valve assembly 120 may include a sealing member 118 having a gasket 119. In an open position, a drop gate 122 (or valve) opens a pathway from an aperture 112 through to the container 10. When the dispensing mechanism is depicted in a loaded and unsealed position in the figures the drop gate valve may be shown as open to view the structure behind. One purpose is for displaying an interior, or second side 125 of the valve assembly. In addition, the rim 13 of the container 10 may be more easily seen with the drop gate 122 in the open position. One may also envision the positioning of the drop gate 122 within the enclosure when the dispensing mechanism is in the dispense position 375. In the dispense position 375, the rim 13 of the container 10 may be sealed against the valve assembly 120 while the open position of the drop gate 122 exposes a pathway or aperture 112 between the open container and the hopper 300. The aperture 112 may be the same size as an opening 12 of the container 10. A valve used in place of the drop gate design may be selected from any number of valve types, such as iris, sliding gate, butterfly, rotary, spherical disc, or a retractable sleeve. The drop gate 122 is operated with a valve actuator 130. As shown in FIG. 4, the valve assembly 120 forms an enclosure with hopper 300 using a valve casing 116 having a flange 114. The flange 114 may contact a lip 314 of the hopper in the dispense position 375 (see FIG. 4) to form a second seal between the valve assembly 120 and the hopper 300. A clamp draw arm 350 on the hopper 300 may engage a clamp latch plate 150, 152 on the valve assembly 120 for securing the dispensing mechanism 100 in the dispense position 375. The clamp draw arm 350 may assist in forming a seal between the valve assembly 120 and the hopper 300. Alternatively, the weight of dispensing mechanism 100 may form the seal sufficiently to prevent material dispensed from the container 10 to escape the enclosure 200.

The valve assembly 120 may have a sealing member 118 having a first side 115 and a second side 125. A rim seat 113 may be disposed on the first side 115 to form the first seal between a rim 13 of the container 10 and the sealing member 118. An aperture 112 may be disposed through the sealing member 118 of the valve assembly 120. The rim seat 113 may be disposed along and adjacent to an outer perimeter of the aperture 112 on the first side 115 of the sealing member 118 (shown in FIG. 20). An interior perimeter of the rim seat 113 may match an outer perimeter, or circumference, of the aperture 112. The rim seat 113 shown is circular having a diameter matching a rim 13 of the container 10. Alternatively, the rim seat 113 may be selected from a variety of shapes being square, rectangular, conical, or cylindrical, to match the shape of the rim 13 on the originally provided container.

The engagement device 170 engages the container 10 with the dispensing mechanism 100. A rim 13 of the container 10 is forced against a rim seat 113 of the valve assembly 120 by force applied from the container actuator 180 of the dispensing mechanism 100. The valve assembly 120 seals the opening 12 of the container 10 to prevent dusting or contamination of the surrounding environment. The valve assembly 120 and the container 10 in the sealed position 275 may move together between the load position 175 and a dispense position 375. In the dispense position, the valve assembly 120 forms an enclosure 200 with the hopper 300 and the container. The enclosure 200 may reduce or prevent dusting or contamination of the surrounding environment when a product is dispensed from the container 10.

The product dispenses through an aperture 112 when a valve, such as a drop gate 122, is opened. The drop gate 122 may be made from a sheet of metal. The drop gate 122 may be square, rectangular, circular, or any number of shapes that will serve as a lid for the container when the drop gate 122 is in a closed position. The sheet of metal may be divided into two, or more, equal halves to limit the displacement distance made by a leading edge of the drop gate 122 when moving from the closed position to an open position. A bracket or a plurality of brackets may be disposed and affixed along, or adjacent to a pivot edge of the drop gate 122. A valve actuator 130 may pivot the drop gate 122 from the closed position to the open position, and vice versa. The valve actuator 130 may have a latch that secures the drop gate 122 in the close position until an initiated time to dispense the product. The valve actuator 130 may be operated manually or automatically. A pneumatic or hydraulic cylinder or a plurality of pneumatic or hydraulic cylinders may be used to assist the drop gate 122 between the closed position and the open position. An actuator may be used to assist the drop gate 122 between the closed position and the open position. The drop gate 122 shown in FIG. 1 provides a mostly complete opening in the open position and the opening is generally sealed in the closed position. The opening of the drop gate 122 may occur slowly (or partially) to limit or meter a release of the product into the hopper 300. Alternatively, the opening of the drop gate 122 may be quick and complete to dispense the product generally instantaneously. The aperture 112 may match a diameter of the opening 12 of the container 10 installed. The aperture 112 may be less than the diameter of the opening 12 of the container 10 to aid in restricting the flow of a product that is more flowable. An opening of the drop gate 122, optionally having no center restriction, may allow for a substantial or complete release of the product, especially if the product itself is less flowable or has a greater angle of repose. An operator may apply a force to the edge or base end 11 of the container 10 to aid in release of the product. Alternatively, a vibratory mechanism may be installed on the dispensing mechanism 100 or container 10. Vibration from the vibratory mechanism may aid in the release of the product. Vibration applied to the dispensing mechanism 100 and container 10 may be caused during operation of the dry additive feeder 400.

Figure 2:
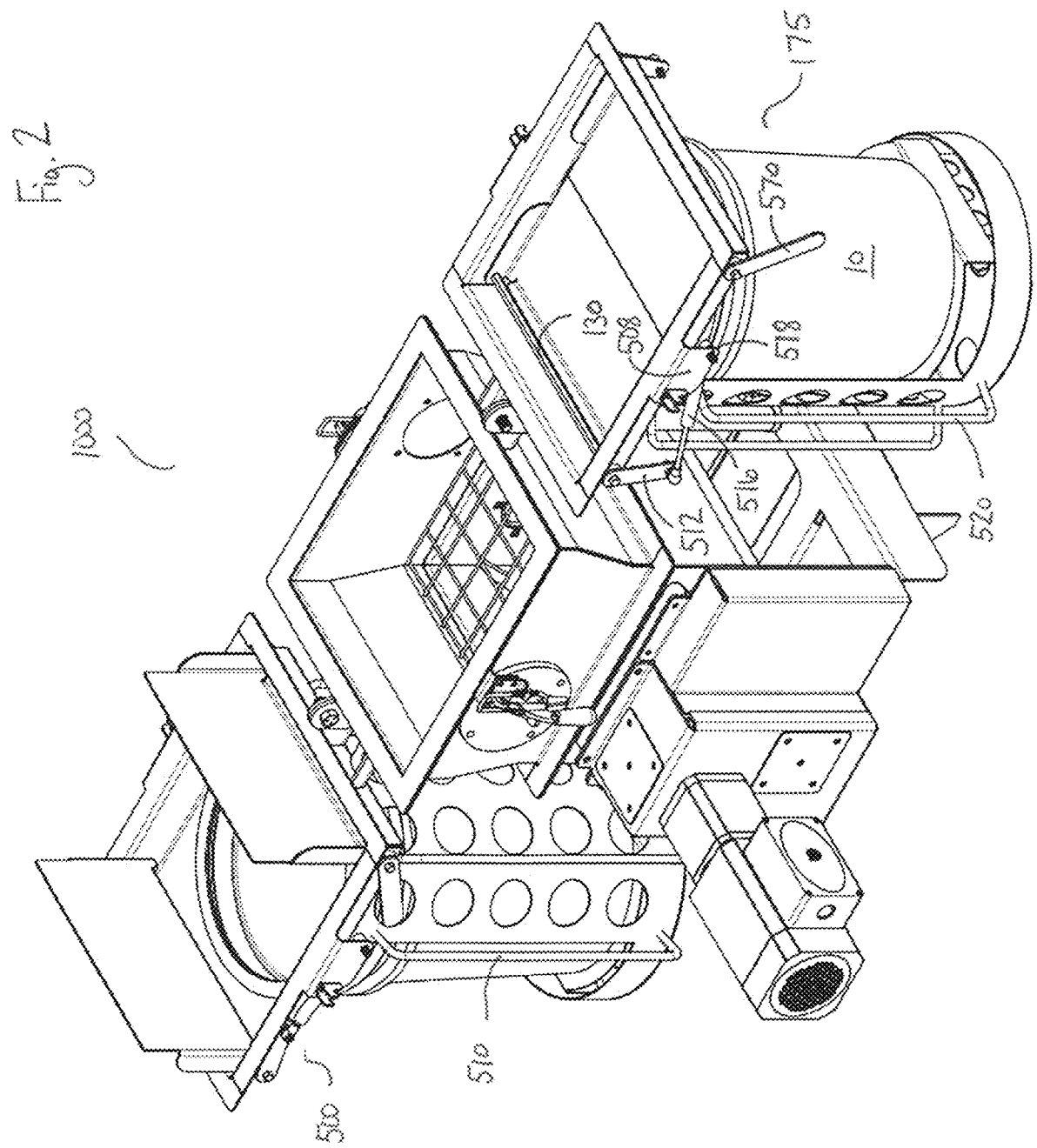
FIG. 2 shows a top-side perspective view of a hopper-container arrangement with one version of dispensing mechanisms displaying assist devices.

Referring now to FIG. 2, a diagram is shown illustrating a front perspective view of the hopper-container arrangement with another version of the dispensing mechanisms attached. As shown, the dispensing mechanisms include a plurality of assist devices. The assist devices will be discussed later, in further detail, by way of illustration and may include the following: (1) a valve linkage with an assist actuator to automate opening and closing of the drop gate(s); (2) a handle assembly to manually move the dispensing mechanism 100 and the engaged container 10 to or from a load position 175; (3) a relief valve and adjustment to equilibrate air pressures between an inside and outside of the enclosure; (4) an inversion assist mechanism with an assist actuator to automate opening and closing of the drop gate(s); and (5) a valve or gate lever to manually open and close the drop gate.

Figure 3:
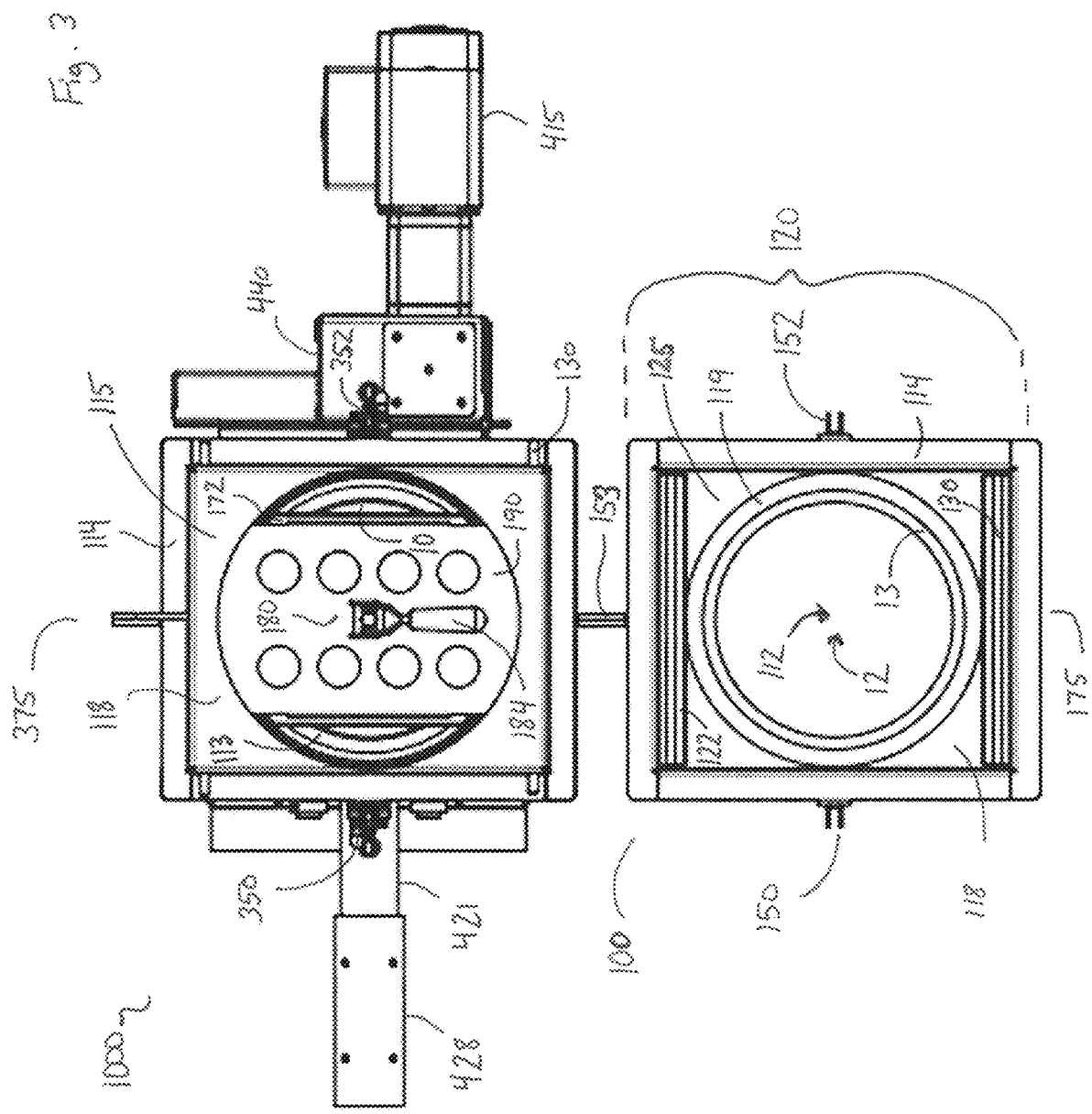
FIG. 3 shows a top view of the hopper-container arrangement from FIG. 1 with one dispensing mechanism in a dispense position.

Referring now to FIG. 3, a diagram is shown illustrating a top view of a hopper-container dispensing mechanism 1000 having a plurality of dispensing mechanisms in a hopper-container arrangement. As shown, a first dispensing mechanism, with a container 10, is in a load position 175 adjacent to the hopper 300. The second dispensing mechanism is in a dispense position 375 directly over the hopper 300 which is directly over the dry additive feeder 400. The first dispensing mechanism is shown with the drop gate 122 open, exposing the aperture 112 of the valve assembly 120 along with the opening 12 of the container 10. The aperture 112 is disposed through the sealing member 118 of the valve assembly 120. The sealing member 118 may be made up of a flat, sheet of metal, with or without a gasket 119. The gasket 119 may be disposed along a rim of the aperture 112 on a second side 125 of the valve assembly 120. The gasket 119 may be made up of a ring of rubber, silicone, or other flexible or rigid material to provide a sealing surface between the sealing member 118 and the drop gate 122. The gasket 119 may be flat or U-shaped or have another shape for receiving an edge of the sealing member 118 and forming a seal with the container 10 and the hopper 300. If U-shaped, the gasket 119 may receive an edge of the sealing member 118 along the perimeter of the aperture 112. In this configuration, the gasket 119 may serve as the sealable surface for a first side 115 and the second side 125 of the valve assembly 120. The gasket may have another U-shaped face extending away from the face of the sealing member 118 on the second side 125 to receive an edge or lip of the hopper 300.

Figure 5:
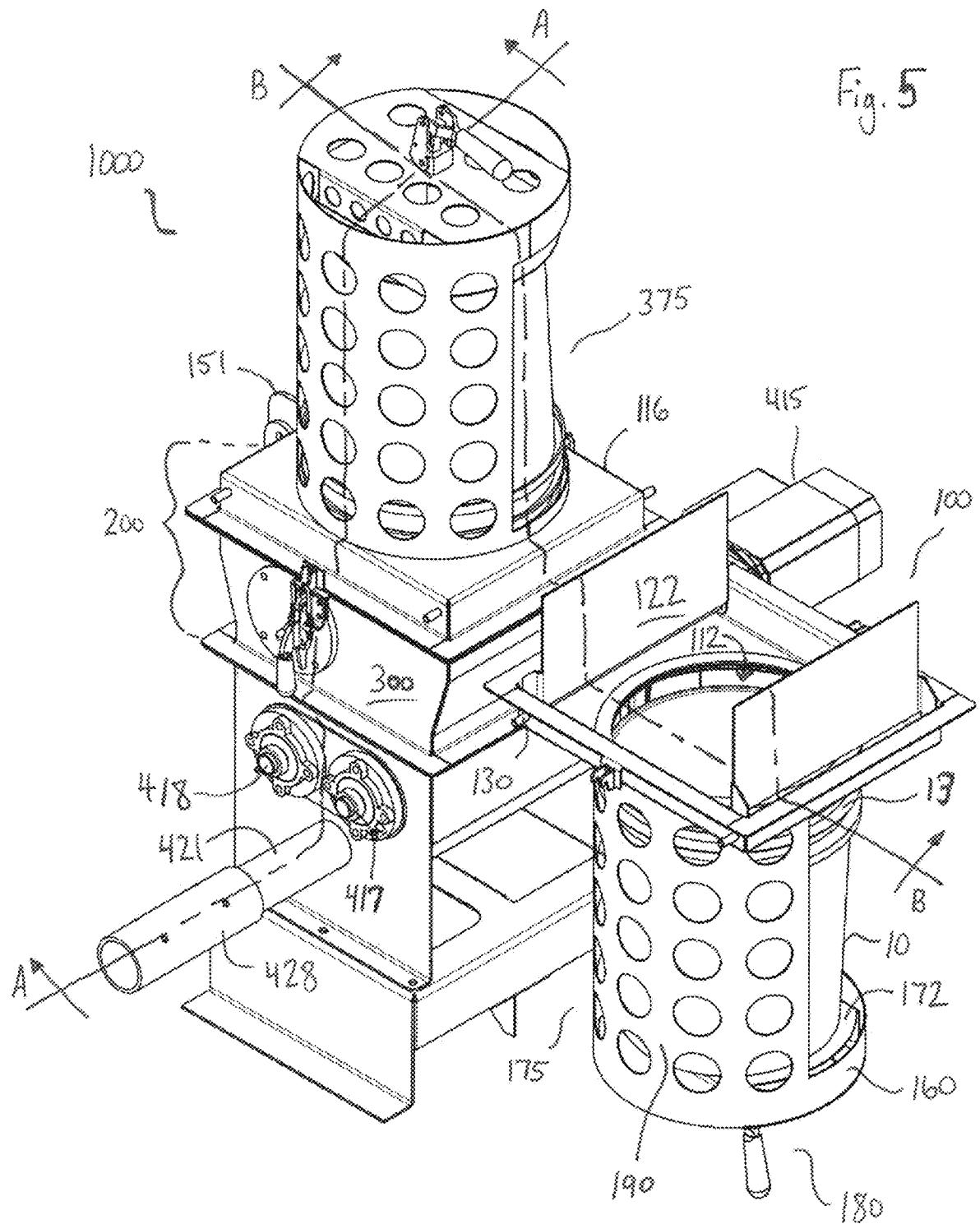
FIG. 5 shows a top-side perspective view of FIG. 4.

Referring to FIGS. 3, 4, and 5, a first dispensing mechanism, with a container 10, is in a load position adjacent to the hopper 300. The container actuator 180 is engaged after the container 10 is placed in the load position 175. The container 10 may be placed into a sealed position 275 (see FIG. 6) by engagement of the container actuator 180 to seal the container 10. The container actuator 180 (or other container securing device) may be selected from any number of tensioners, springs, or clamp types as discussed later. The container actuator 180 may tension an open end of the product container towards a sealing member 118 of the valve assembly 120. Alternatively, the actuator may be configured to serve as a tensioner to move the sealing member 118 of the valve assembly 120 towards the open end of the product container. The sealing member 118 of the valve assembly 120 may hold a rim seat 113 that is operable to abut against a rim 13 of the container 10. The rim seat 113 may be disposed along a rim of the aperture 112 on the first side 115 of the valve assembly 120. The rim seat 113 may be made up of a ring of rubber, silicone, or other flexible or rigid material to provide a sealing surface between the sealing member 118 and the container 10. The rim seat 113 may be flat or U-shaped. If U-shaped, the rim seat 113 may receive an edge of the sealing member 118 along the perimeter of the aperture 112. In this configuration, the rim seat 113 may serve as the sealable surface for the first side 115 and the second side 125 of the valve assembly 120. The rim seat 113 may have a U-shaped face extending away from the face of the sealing member 118 on the first side 115 to receive an edge or rim of the container 10. A first seal is formed between the open end of the container and the valve assembly 120 before the dispensing mechanism 100 and the container 10 are inverted into the dispense position 375. Placement of the valve assembly 120 against a hopper of the dry additive feeder 400 forms an enclosure (see FIGS. 5 & 6) between the container 10 and the dry additive feeder 400. A flange 114 of the valve assembly 120 may be disposed along an outside perimeter of the valve assembly 120. As the container 10 is inverted from a load position 175 adjacent to the hopper 300, the contents (product) of the container 10 are maintained in a sealed position 275. In the dispense position 375, the flange 114 may enclose the aperture 112 and the drop gate 122 when the flange 114 is abutted against a lip 314 of the hopper 300 (shown in FIGS. 5 & 6). After the enclosure is formed, a valve actuator 130 is engaged to open an aperture 112 of the valve assembly 120.

As shown in FIGS. 3, 4, 5, and 7, a plurality of dispensing mechanisms may be attached to the hopper 300. The plurality of dispensing mechanisms may be disposed on opposing sides of the hopper. A second dispensing mechanism engaged with a second container is shown in the dispense position 375 above the hopper 300. In a sequential dispensing process, a first dispensing mechanism can be in the load position 175 while a second dispensing mechanism is in the dispense position 375, and vice versa. Alternatively, the hopper-container dispensing mechanism 1000 may be arranged for a simultaneous dispensing process. In a double-barrel configuration, the hopper can accept two dispensing mechanisms at once, side-by-side. In this example, a lip of the hopper may be in a rectangular shape. The lip of the hopper may be sized to join with square-shaped flanges of two dispensing mechanisms at once. The rectangular shaped hopper lip may have an outer boundary encompassing a surface area equal to the combined surface area within a combined outer boundary of the square-shaped flanges. In another example, a lip of the hopper in the double-barrel configuration may be a figure-eight shape. In the figure-eight shape, two dispensing mechanism having circular-shaped flanges may join simultaneously with a hopper having a lip with two congruently shaped circles connected side-by-side. The four dispensing mechanisms may each have a circular flange and may be joined at one time with a hopper having an outer lip in the shape of a four-leaf clover with circular lobes. Alternatively, an outer boundary of a square-shaped hopper lip may be sized greater to accommodate four dispensing mechanisms with smaller square shaped flanges.

The first or second dispensing mechanisms may be secured in the dispense position 375 with a hopper securing device. A hopper securing device or locking device, clamp 352, is shown attached to the hopper 300. The hopper securing device may be selected from any number of tensioners or clamp types such as over-center, hold-down, c-type, push-pull, reverse-action push-pull, latch-style, spring and plier, bar, screw, vise, air-powered, lever-action, spring assisted, remote assisted, hydraulic bolt, ratchet, cam, crank, cable, draw latch, spreader style, or bar style. Alternatively, other securing devices such as a clasp, glue, magnetic, a hydraulic strut, a band, an elastic cord, suction device, vacuum-powered device, or rubber strapping may be used. The clamp 352 is shown as a McMaster Carr® latch-style toggle type clamp. In the dispense position, a clamp draw arm 350 of the clamp 352 may be latched upon the clamp latch plate 152 attached to the dispensing mechanism. When a clamp handle 384 of the clamp 352 is pulled downward 204, the clamp draw arm 350 placed and received by the clamp latch plate 152 pulls the dispensing mechanism 100 in an axis generally parallel to the height of the container 10. The downward 204 pulling force on the clamp latch plate 152 causes a flange 114 of the valve assembly to be forced against the lip 314 of the hopper 300. Alternatively, the flange 114 may be sized greater than the lip 314 of the hopper 300 thereby encompassing the lip of the hopper to form the enclosure 200.

Figure 6:
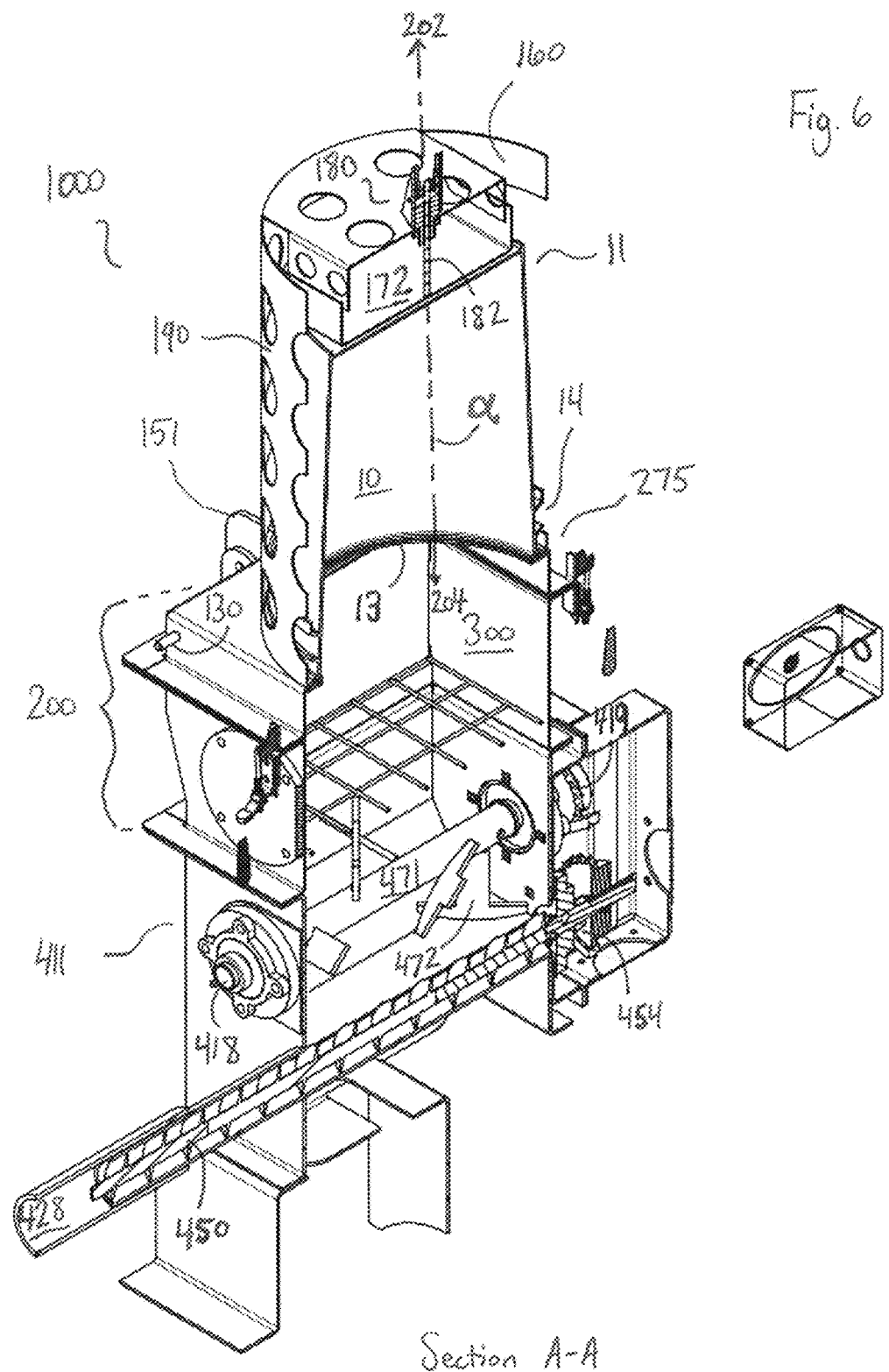
FIG. 6 shows a top-side perspective view of FIG. 5 displaying a cross-sectional arrangement of the enclosed hopper-container dispensing mechanism and a dry feeder.

The enclosure 200 forms a sealed chamber between a container 10 and the hopper 300, as shown in cutaway in FIG. 6. The enclosure 200 may have a height equal to or exceeding the height of the drop gate 122. As shown, the drop gate 122 of the first dispensing mechanism in the load position 175 is open, where a width of the drop gate 122 has a first edge extending in an upward direction. After a user has moved the second dispensing mechanism and a second container from the dispense position 375 to the load position 175, the first dispensing mechanism and a first container may be moved from the load position 175 to the dispense position 375. The drop gate 122 may be closed during this movement to seal the container 10 from releasing product during inversion. After the first dispensing mechanism is pivoted into the dispense position 375, a valve actuator 130 may be engaged to open the drop gate 122, where the first edge of the drop gate 122 extends in a downward 204 direction towards, or into, an open end of the hopper 300 along the parallel axis (α) relative to the height of the container 10. The width of the drop gate 122 may be equal to or less than the height of the enclosure 200. The heights of a transition element 325, enclosure 200, or hopper 300 may be at least equal to the size of the aperture 112 divided by the number of drop gates. The aperture 112 of the sealing member 118 may have a diameter that is approximately equal to the opening 12 of the container 10. This allows for the product within the container 10, under the force of gravity, to release from the container 10 into the hopper 300 through an opening while remaining enclosed.

A structural member 190 of the engagement device 170, as shown in FIG. 5, may partially envelope the container 10. The structural member 190 may act as a protective casing to aid the user in placement of the container 10. The container 10 may be placed onto a product stand 172 of the engagement device 170 in the load position 175. The structural member 190 may prevent the container 10 from being pushed off the product stand 172 during the container's placement. The structural member 190 may be made of metal or other rigid material. Cutouts, shown as circular holes in FIG. 5, may be disposed through the structural member 190 to reduce the overall weight of the dispensing mechanism 100. A base member 160 connected to the structural member 190 may encompass and serve as a base for the product stand 172. The structural member 190 also provides structural support between the valve assembly 120 and the base member 160.

Figure 7:
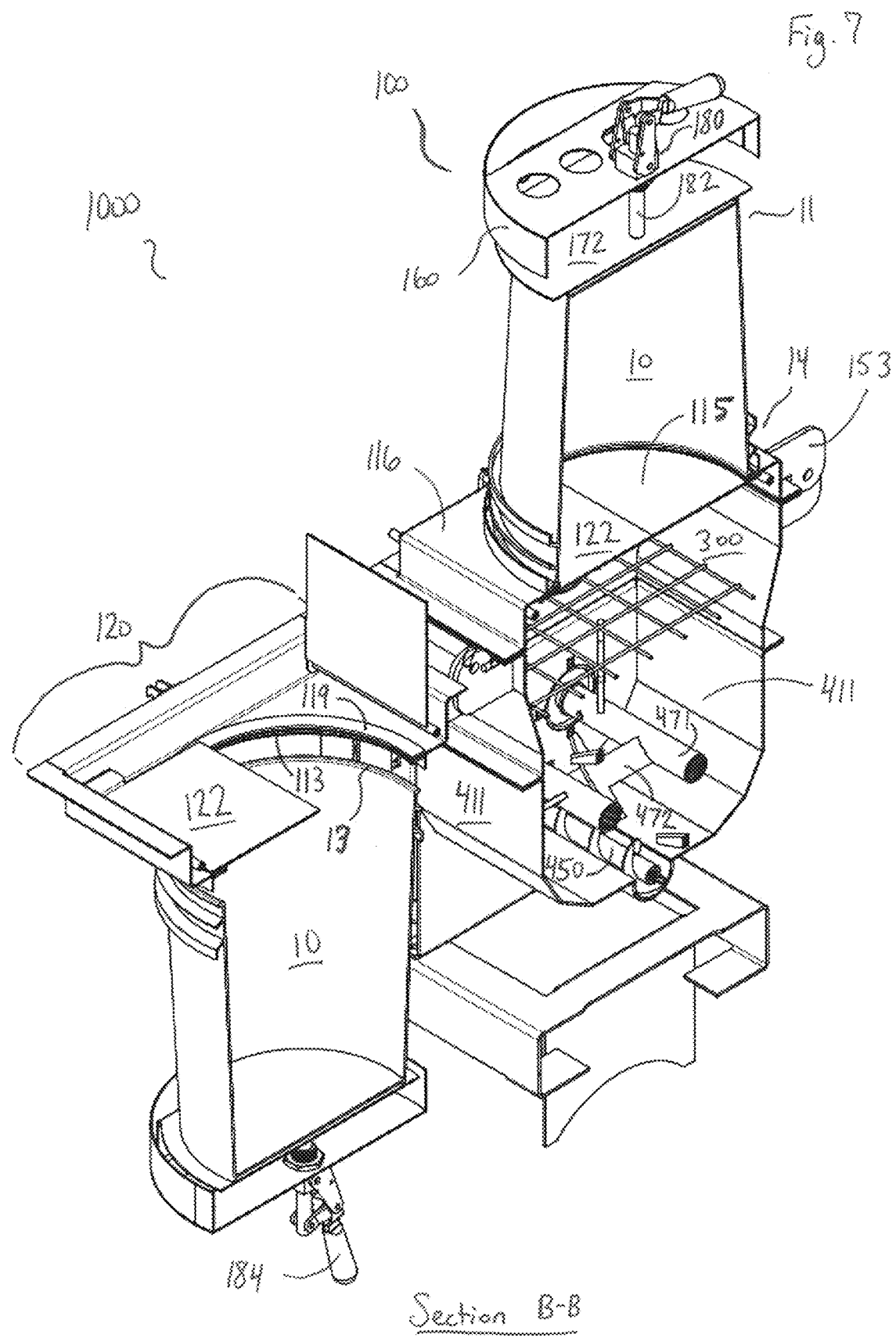
FIG. 7 shows another top-side perspective view of FIG. 5 displaying a cross-sectional arrangement of the enclosed hopper-container dispensing mechanism and the dry feeder.

As shown in FIGS. 6 and 7, the structural support provided by the base member 160 or the structural member 190 may enable the container actuator 180 to raise or lower the product stand 172 that is movable. An actuator rod 182 of the container actuator 180 may be secured to the product stand 172. A fastener may be passed through a stand securing aperture 174 (shown in FIG. 17) disposed through the product stand 172. The fastener may retain the product stand 172 against the actuator rod 182. The fastener may be selected from any number of threaded bolts or screws. Alternatively, the fastener may be a snap pin passed through the actuator rod 182 and secured below the product stand 172. The actuator rod 182 may press a base end 11 of the container 10 placed on the product stand 172 towards the valve assembly 120. The actuator rod 182 may supply the product stand 172 with force to press and seal a dispense end 14 of the container 10 against the sealing member 118. An actuator handle 184 may be connected between an end of the actuator rod 182 and the base member 160. The actuator handle 184 may assist actuation of the actuator rod 182.

The container 10 holding the product may be rigid, such as a high-density polyethylene (HDPE) 5-gallon (gal) bucket having a dispense end 14 and a base end 11. Alternatively, the container 10 may be a 1-gal, 1.25-gal, 2-gal, 3-gal, 3.5-gal, 4-gal, 4.25-gal, 5.25-gal, 6-gal, 6.5-gal, 7-gal, 7.5-gal, 20-gal, 55-gal or other larger or smaller size having a selected volume or shape. In other applications, jars, jugs, drums, barrels, cylinders, pails, boxes, and totes of varied volumes, shapes, and opening sizes may be accepted by the dispensing mechanism 100 and sealed to the valve assembly 120. Depending on the application, the hopper-container dispensing mechanism 1000 may be appropriately manufactured to receive smaller or larger sizes of containers. For example, in huge batch mixing operations, a palletized tote or box may hold the product. An operator using a forklift may position the palletized box into the dispensing mechanism 100 in a load position 175. Appropriately sized assist devices may be utilized to invert the palletized box in from the load position 175 to the dispense position 375 when in the sealed position 275.

A variety of adaptors or attachment plates and gaskets may be used to change the aperture 112 size and shape to match an opening 12 size and shape of the container 10. For example, an adaptor or attachment plate may be fastened to the first side 115 of the valve assembly to reduce the aperture 112 designed for a 5-gallon bucket to a diameter that cooperates with an opening 12 of a 3.5-gallon bucket. Additionally, a variety of converters, funnels, reducers, and spacers may be used to adjust the spacing between the valve assembly 120 and the engagement device 170. Adjustments may be based on a height of the container 10. In one example, a funnel or reducer may be connected to a first side 115 of the valve assembly 120 for loading of a smaller container. The reducer may taper along its length from a larger diameter opening sized to couple with the aperture 112 to a smaller diameter opening sized to couple with an opening 12 of the selected container 10.

In another example, the dispensing mechanism may be manufactured according to a size of the container, such as when a taller 7.5-gal bucket is used. As previously discussed, the structural member 190 may serve as a structural member between the base member 160 and the valve assembly 120. Alternative to the structural member 190, a pipe, bar, or other slat may be used as the structural member to maintain or provide a separation distance between the base member 160 and the valve assembly 120. The structural member 190 may be sized, or made adjustable, according to a height of the container. The structural member 190 length may be based upon a selected displacement distance between the load position 175 of the container and a sealed position 275 of the container. The structural member 190 may be adjustable along its length between the base member 160 and the valve assembly 120. Alternatively, a connection member found between the base member 160 and the structural member 190, or between the structural member 190 and the valve assembly 120, may be adjustably sized according to a height of the container selected. The connection and structural members may be made adjustable by a pin and slot mechanism (shown in FIG. 25), rack and pinion mechanism, ratchet mechanism, telescoping mechanism, or other engagement device to accommodate a selected displacement distance between the base member 160 and the valve assembly 120 in accordance with the height of a container selected.

In another example, a spacer may be placed on the product stand 172 of the engagement device 170 to raise a smaller container 10 in the load position 175 that is unsealed. The spacer may have a height that supports the container 10 between the product stand 172 and the rim 13 of the engagement device 170 within 2 inches to 3 inches remaining therebetween. The remaining 2 inches to 3 inches of displacement distance may be reduced by forcing the engagement device 170 into a sealed position 275 by the container actuator 180.

As discussed previously, but now in more detail, the container actuator 180 may be attached to the dispensing mechanism 100 and configured to force the container 10 against the valve assembly 120 or alternatively, the valve assembly 120 against the container 10. In the example shown, the dispensing mechanism 100 allows the container 10 to form a first seal with the valve assembly 120 when the product stand 172 pushes up on the container 10. The valve assembly 120 maintains a sealed, enclosed environment with the dispense end 14 of the container 10 as the product stand 172 is pressed against the base end 11 of the container 10. The container actuator 180 is attached to a base of the structural member 190. The base is used as a support for the container actuator 180 to apply a force against, to move the product stand 172 and container 10. When operable with the container actuator 180, the product stand 172 can be made movable. The product stand 172 moves relative to the base member 160 from a load position 175 that is unsealed to a sealed position 275 along the axis (α) that is parallel to the height of the container. In the sealed position 275, the product stand 172 forces, or pushes, a rim 13 of the container 10 against a rim seat 113 of the valve assembly 120. The displacement distance the product stand 172 moves the container 10 may range from 1 inch to 5 inches. Alternatively, the displacement distance may range any length that will aid the user in efficient placement of the container 10 in the load position 175 that is unsealed and movement of the container 10 to the sealed position 275.

Referring again to FIGS. 6 and 7, a diagram is shown illustrating a cutaway perspective view (Section A-A and Section B-B) of the inside of the hopper-container dispensing mechanism 1000 of FIG. 5. As shown by Section A-A, the product (not shown) of the container 10 can be dispensed through the hopper 300 into the mixing portion 411 of the dry additive feeder 400 in a downward 204 direction along an axis (α) parallel to the height of the container. As shown by Section B-B, the product may be maintained within the container 10 by the drop gate 122 until actuated by the valve actuator 130. Upon engaging a valve actuator 130 of the valve assembly, a valve aperture is opened between the valve assembly 120 and the hopper 300. The product can pass through the hopper 300 into the mixing portion 411 of the dry additive feeder 400.

The example of the dry additive feeder 400 shown in FIGS. 6 and 7 is similar to a dry feeder disclosed in non-provisional U.S. patent application Ser. No. 15/464,770, filed on 21 Mar. 2017, which is hereby incorporated by reference. The mixing portion 411 contains a first beater 417 and a second beater 418. The mixing portion 411 may be coupled to a hopper 300, or transition element 325, and receive a powdered product from the hopper. A conduit 421 extends horizontally from the mixing portion 411. A screw conveyor 450—or auger—within the conduit 421 transfers the material through the horizontal conduit to an inlet of a seed treatment conveyor. The horizontal conduit has a distal end, away from the hopper, that has a discharge end 428 for dispensing the material. The screw conveyor 450 may be a root shaft with spiral blades. As the screw conveyor 450 turns, the material is transferred through the conduit 421 and toward the discharge end 428.

A motor 415 may be operationally coupled to turn the screw conveyor 450 and the beater assembly. The beater assembly may include the beater axles and the beater blades. For example, the motor may be directly connected to a first beater, with a sprocket gear for receiving a chain for driving a second beater and the screw conveyor. By regulating the speed of the motor, the speed of the beaters and the speed of the screw conveyor are affected. In another example, a separate motor is coupled to the screw conveyor 450 to independently control the speed of the screw conveyor relative to the speed of the first beater 417 and the second beater 418. In the example shown, the motor 415 is operationally coupled to a beater axle of the first beater 417 and powers the beater assembly. The beater assembly is operationally coupled to turn the beater blades 472 and a rotating, driving sprocket (not shown). The driving sprocket may transfer rotational movement to a belt or chain (not shown) which in turn rotates a driven sprocket 419 to turn a beater axle 471 of the second beater 418.

A control system 440 can be coupled with the motor 415 to adjust the dispensing rate. The control system 440 regulates the speed of the screw conveyor 450. In one configuration, the motor 415 is operationally coupled to turn the beater assembly and the screw conveyor 450 via a belt or chain. A screw conveyor sprocket 454 may be made operable with the driving sprocket via the belt or chain. In another configuration, the screw conveyor 450 is operationally coupled to and powered by another, separate motor.

Figure 8:
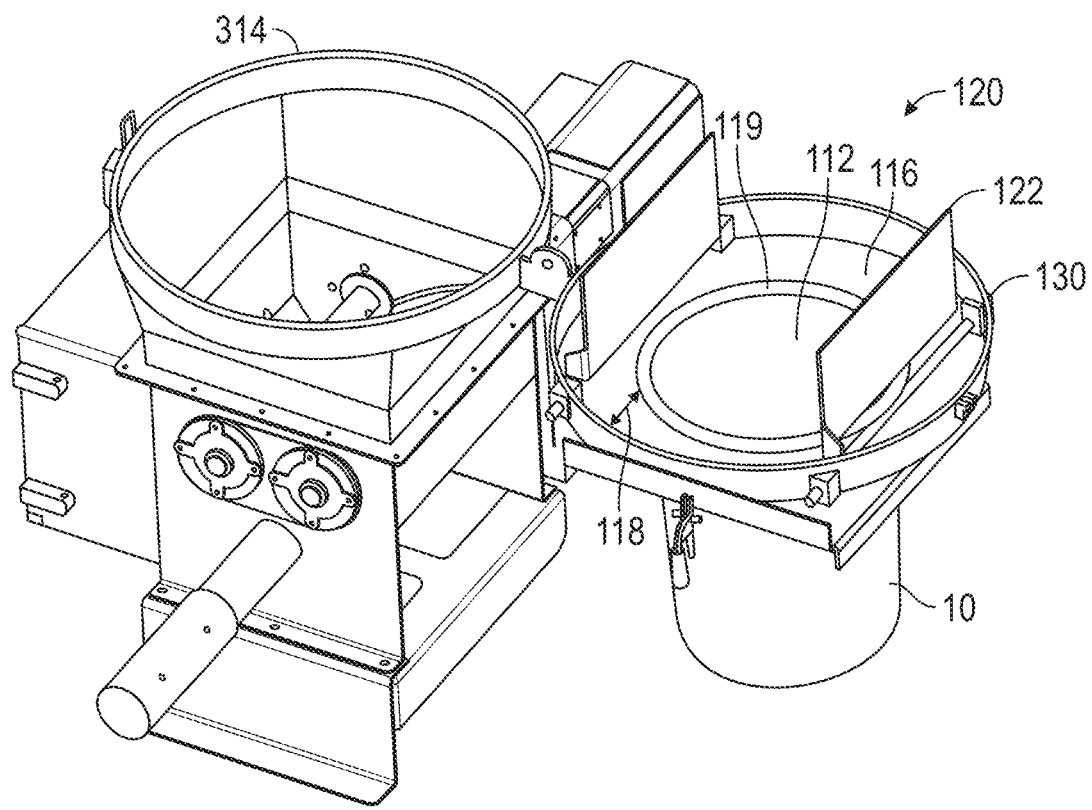
FIG. 8 shows a top-side perspective view of one version of a hopper-container arrangement with a dispensing mechanism in a sealed position.

Referring now to FIG. 8, another variation of the valve assembly 120 is shown with a flange 114 on an outer perimeter of the valve assembly 120. In this example, the flange 114 is configured to enclose a lip 314 of a hopper 300 having a substantially congruent shape, such as a circle. As shown in FIG. 11, a diameter of the flange 114 is slightly greater than a diameter of the hopper's outer lip surface. When the dispensing mechanism 100 is placed into a dispense position 375, the outer flange encircles the circular lip of the hopper to form an enclosure 200 between the dispensing mechanism 100 and the hopper 300. A sealing member 118 or gasket 119 may rest upon the lip of the hopper in this variation. The enclosure 200 encapsulates a powdered product, or other dry additive, as it is released from the container 10 in the dispense position when a valve assembly 120 is opened. To further ensure the enclosure 200 is maintained in the dispense position 375, a locking device, such as a latch-style toggle type clamp, may be used. The clamp 352 may be attached to the hopper 300. A clamp latch plate 152 may be attached to a valve casing 116 of the valve assembly. The clamp-latch plate assembly is configured to force the valve assembly 120 in a downwards direction towards and against the hopper 300.

Figure 9:
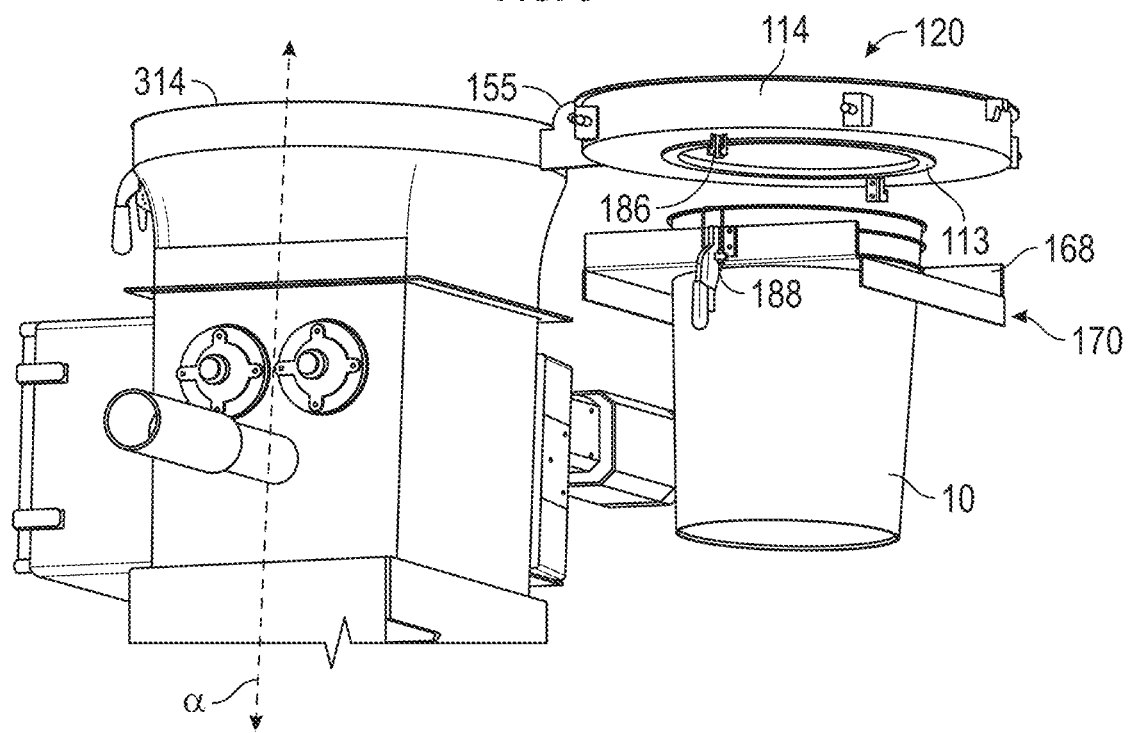
FIG. 9 shows a bottom-side perspective view of the hopper-container arrangement of FIG. 8 displaying the container in an unsealed position with the valve assembly.

An engagement device 170 of the discussed variation is shown in FIG. 9. The engagement device 170 may be a manufactured container collar 168 compatible with the container. The container collar 168 may be obtained from a square sheet of metal or other substantially rigid material. An aperture 112 is disposed through a central portion of the engagement device 170. The aperture 112 has a circumference large enough to receive a base end 11 of a container 10. When a container 10 is slipped into the aperture 112, a rim on a dispense end 14 of the container does not pass through the aperture 112. For example, a 5-gallon container may have a base end 11 having a diameter of approximately 10 inches and a dispense end 14 having a diameter of approximately 12 inches. The aperture 112 of the container collar 168 may have a diameter of 11.5 inches. The tapered nature of the container 10 from the base end 11 to the dispense end 14 allows the container 10 to slip into the aperture 112 of the container collar 168 until the diameter of the aperture matches an outside diameter of 11.5 inches on the bucket exterior. At each outside corner of the container collar 168, a slit approximately 2 inches to 4 inches may be cut towards the central portion. The bifurcation may allow for folding, upward or downward, of the opposite and parallel sides. The folded metal may provide dimensional strength to the sheet of metal. The folded sides of the engagement device 170 may serve as a grip zone for the user when loading and sealing the container 10 with the valve assembly 120.

A pinch mechanism or other container securing device, such as a latch-style toggle type clamp, may be used to attach the container collar 168 to the valve assembly. FIG. 9 shows the clamp 188 in the unlatched configuration. FIG. 10 shows the clamp 188 in the latched configuration. The clamp 188 may be attached to the container collar 168. A clamp latch plate 186 may be attached to a casing of the valve assembly. A clamp draw arm of the clamp 188 may engage the clamp latch plate 186 on the valve assembly 120 for securing the container collar 168 in a latched position. The aperture 112 of the valve assembly 120 may receive a container such as a 5-gallon bucket. The clamp-latch plate assembly is configured to force the container collar 168 against an outer surface of the container in an upwards direction towards the valve assembly. In the example shown in FIG. 9, the valve assembly 120 and container 10 are in a load position 175 adjacent to the hopper 300 of the dry additive feeder 400. The container collar 168 applies a force, via operation of the container securing device, against a rib projecting outward circumferentially on an exterior surface of a dispense end of a 5-gallon bucket. The force applied moves the engagement device 170 and the container 10 towards the valve assembly 120 along a vertical axis (α) parallel with a height of the container 10. The container 10 is moved from a latched position to a sealed position 275. In the sealed position 275, the container collar 168 maintains the rim of the container 10 against a rim seat of the valve assembly 120. The container collar 168 moves the container 10 over a displacement distance that may range from 2 inches to 3 inches. Alternatively, the displacement distance may range any length that aids the user in efficient placement of the container 10 from the latched position to the sealed position 275.

As shown in FIG. 9, the valve assembly 120 is connected to the hopper 300 through a hinge member 155. The hinge member 155 allows for pivotable movement of the valve assembly 120 relative to the hopper 300 as shown in FIG. 10. The hinge member 155, or multiple hinge members may be placed on a periphery of the hopper 300 and the valve assembly 120 so as not to restrict flow of the fluent material. Prior to pivoting the valve assembly 120 upon the hinge member 155 from the load position 175 (see FIG. 12) into the dispense position 375 (see FIG. 13), a drop gate 122 of the valve assembly 120 is closed over the aperture 112. In one example, the drop gate 122 may be closed with a valve actuator 130, such as a latch rod connected to a pivot end of the drop gate 122. In another example, an iris valve with lever may be used by an operator to open and close the aperture 112. A gasket 119 may be disposed on a second side of the valve assembly casing. The gasket 119 may serve as a seal between the valve casing 116 and the drop gate 122 to prevent loss of powdered product during inversion of the dispensing mechanism 100 and container 10. A second gasket may also be disposed on the second side along an outer perimeter of the valve casing 116. In the dispense position 375, the second gasket may form a seal between the valve casing 116 and a lip 314 of the hopper 300. When the drop gate 122 is opened, the aperture 112 fully opens to allow a complete release of the product. Alternatively, the aperture 112 may be metered in opening size by the drop gate 122 to control the fluent material.

Figure 12:
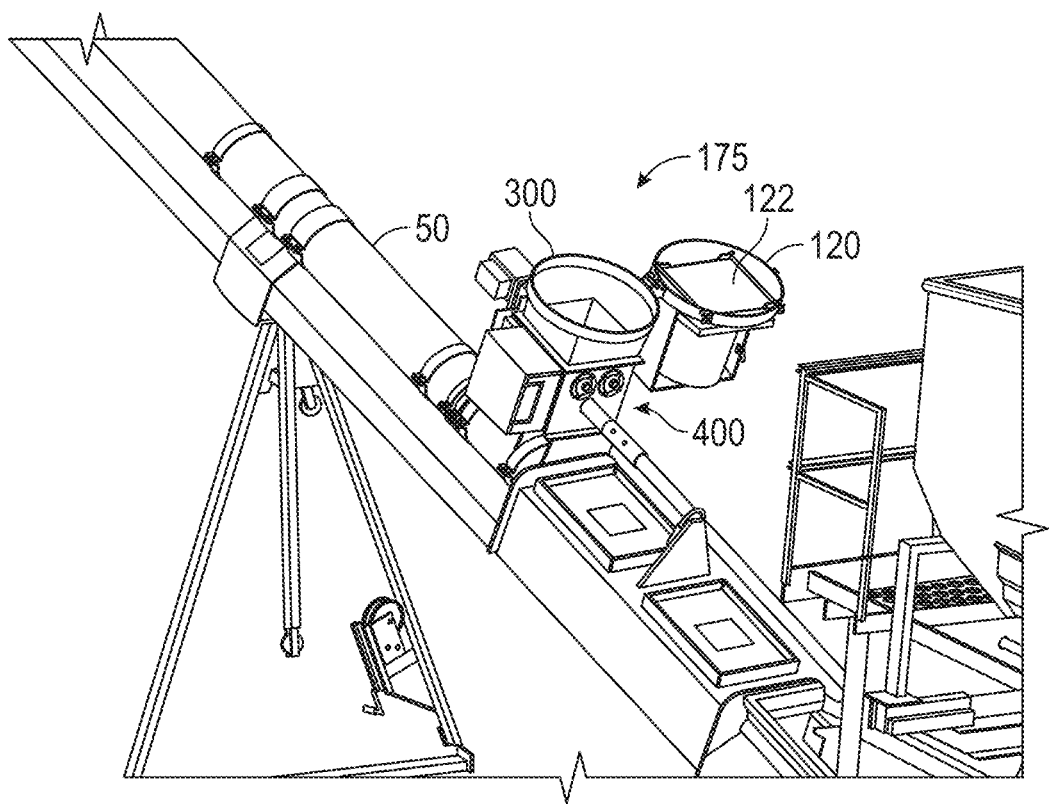
FIG. 12 shows a top-side perspective view of one version of a hopper-container arrangement connected to a seed conveyor through a dry feeder and a dispensing mechanism in a load position and the container in a sealed position.
Figure 13:
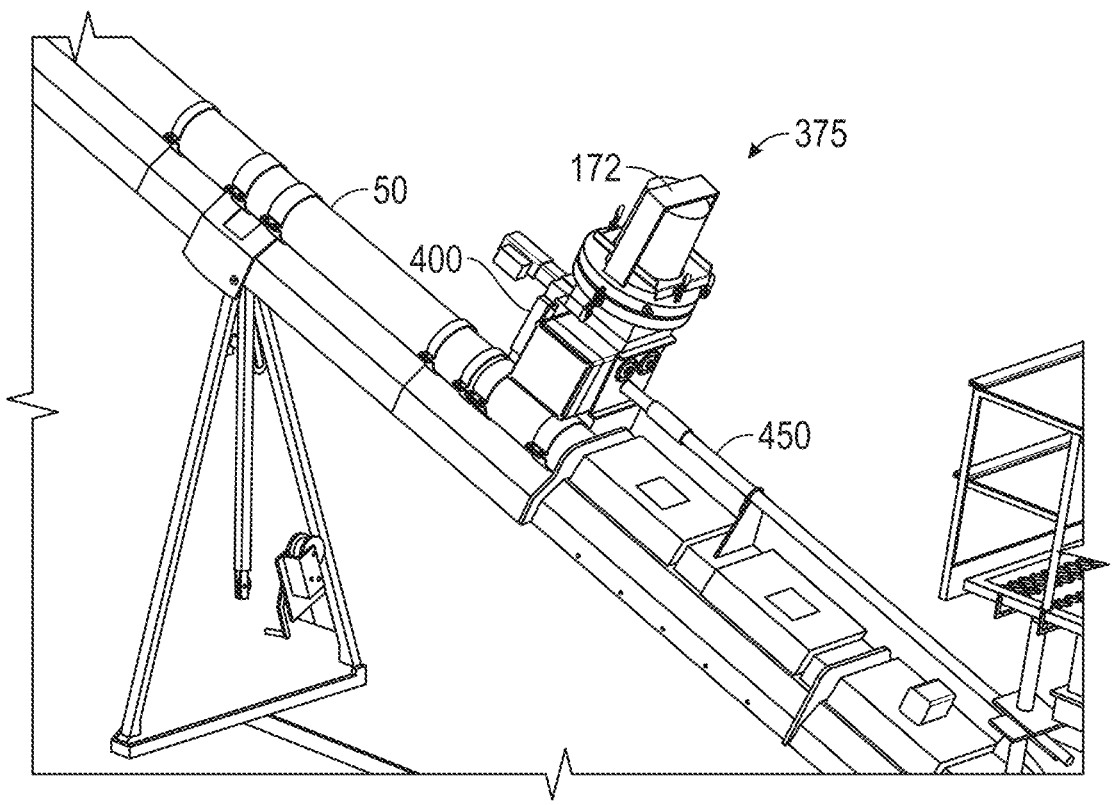
FIG. 13 shows a top-side perspective view of the hopper-container arrangement of FIG. 12 with the dispensing mechanism now in a dispense position.

As shown in FIGS. 12 and 13, the hopper-container dispensing mechanism may be connected to a dry additive feeder 400. The dry additive feeder 400 may be attached to a seed conveyor 50. The product may be dispensed into the dry additive feeder 400 and conveyed to an inlet portion of the seed conveyor 50 as previously discussed. An advantage to using the dispensing mechanism 100 is limiting or preventing the dust and mess caused when an operator loads and dispenses an open product container by pouring the product directly into a hopper 300. Using the dispensing mechanism 100 disclosed, may save the operator time and effort by eliminating the role of the operator in personally holding and maintaining the container 10 above the hopper 300 while product is being dispensed.

Figure 14:
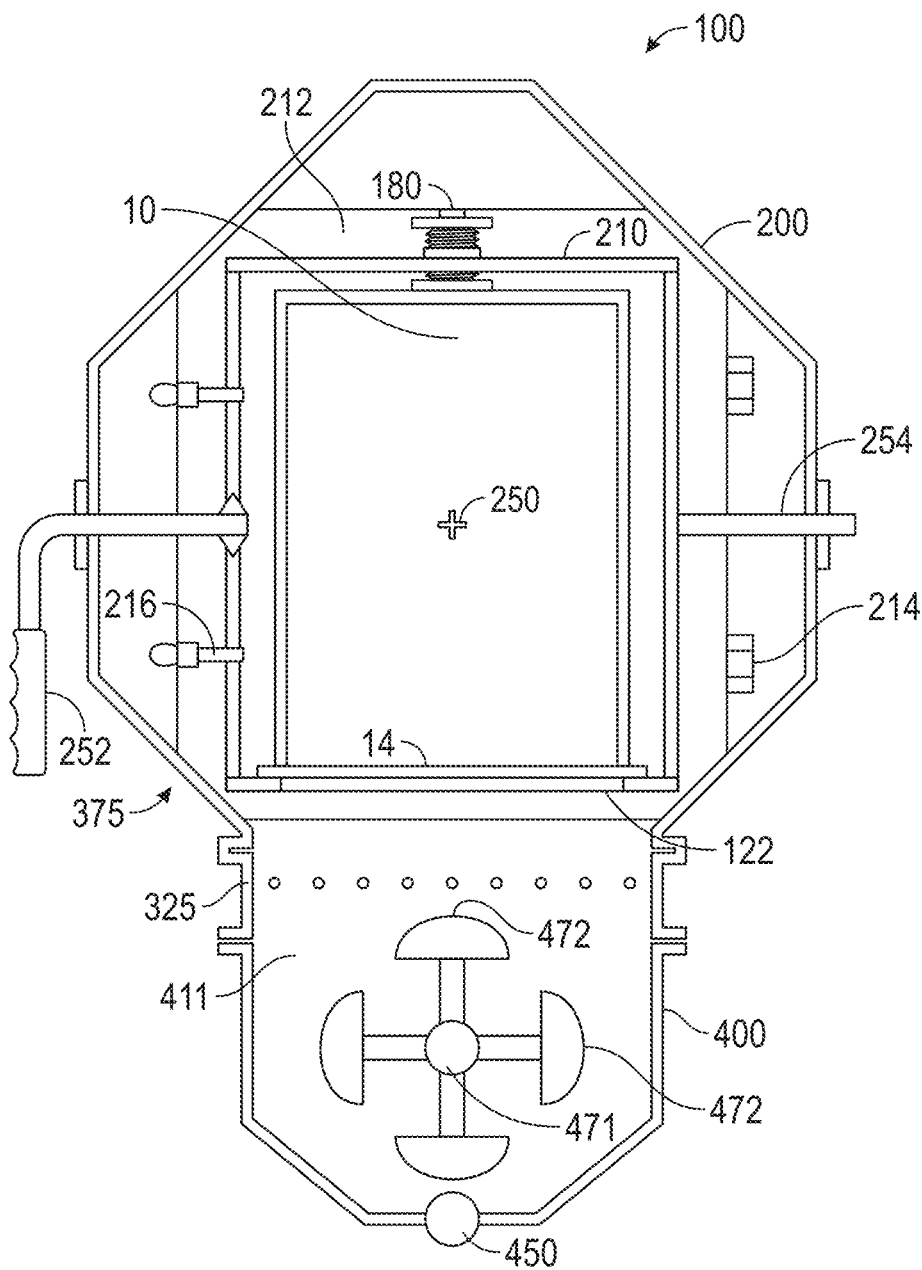
FIG. 14 shows a cross-sectional view of one version of the enclosed hopper-container dispensing mechanism.

Referring now to FIG. 14, a diagram is shown illustrating a cross-sectional view of another example of the dispensing mechanism 100. In this example, an enclosure 200 surrounds the container 10. The enclosure 200 may have an access port(s) or door(s) that may be fastened with a single access door latch 214 or more. In the example shown, an access door hinge 216 provides the fastening means for the access door 212 to open and close. The container 10 may be placed in a load position 175 within an inner chamber 210 of the enclosure 200. An access door 212 seals off the container 10 to prevent dusting of environment outside the inner chamber 210. The enclosure 200 may, or may not, be fastened to the dry additive feeder 400 with a transition element 325. A pivot rod 254 may extend horizontally through the enclosure 200. The pivot rod 254 may terminate at a first exterior side of the inner chamber 210 or enclosure 200 and commence from a second exterior side of the inner chamber 210 or enclosure 200. A first terminal end 252 of the pivot rod 254 may have a bend at an approximate 90-degree angle. The first terminal end 252 may fit into and be encased by a rubber handle. The second terminal end of the pivot rod extending through the inner chamber and/or enclosure 200 may be threaded to receive a washer and threaded nut. The fastener may secure the pivot rod 254 to the dispensing mechanism 100. An operator may turn the handle on the first terminal end 252 of the pivot rod 254 connected to the inner chamber 210 to invert the container 10 residing within.

Figure 15:
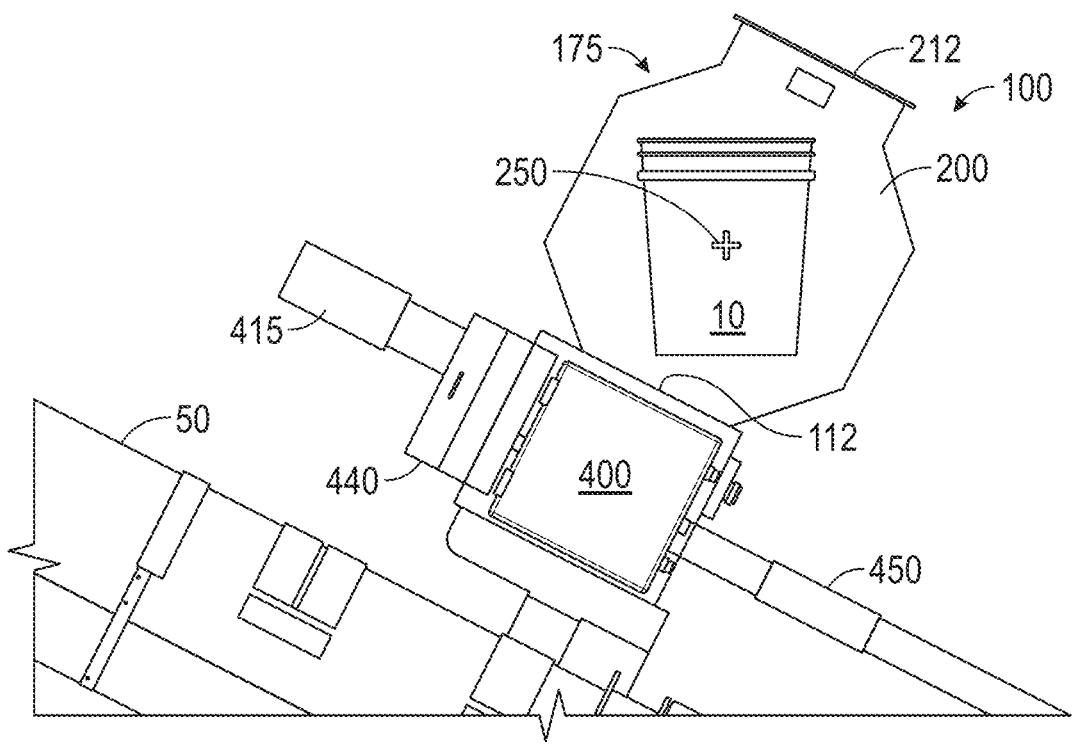
FIG. 15 shows a side perspective view of the dispensing mechanism of FIG. 14, in transparency, to display the orientation of a container in a load position in relation to the dry feeder.
Figure 16:
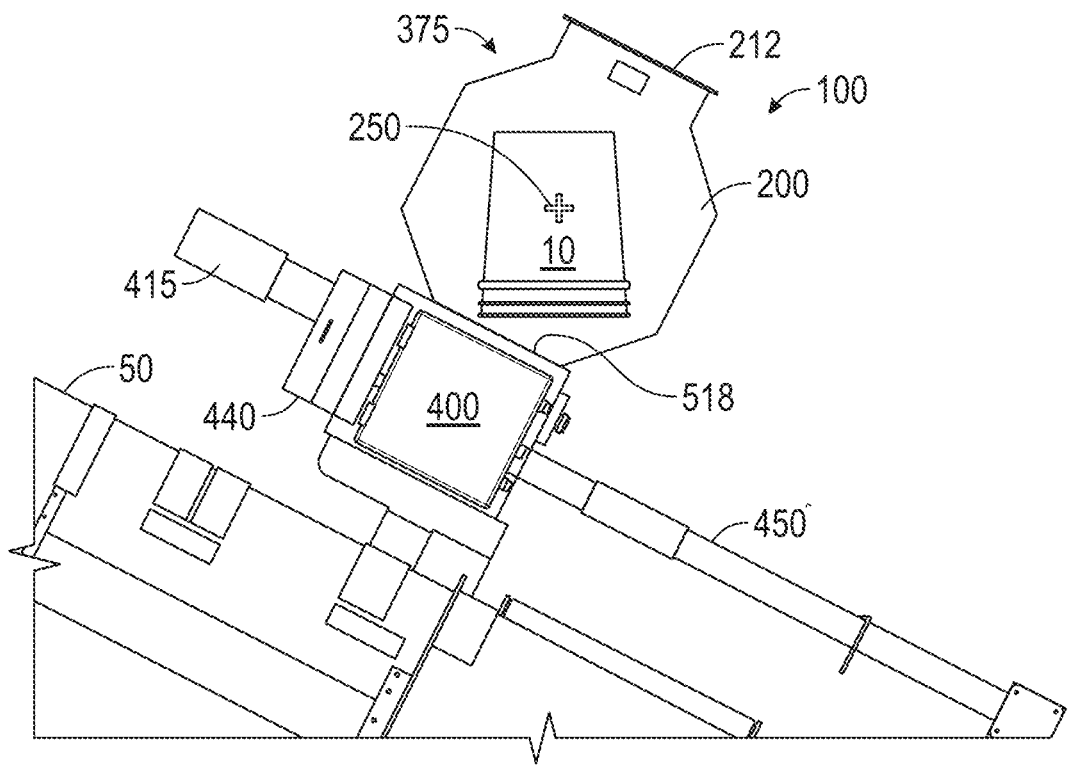
FIG. 16 shows a side perspective view of the dispensing mechanism of FIG. 14, in transparency, to display the orientation of a container in a dispense position in relation to the dry feeder.

As shown in FIG. 15, the container 10 may be loaded into the enclosure 200 and secured in the load position 175. The pivot movement of the container 10 around a central pivot point 250 may be started with movement of a first terminal end 252 of the pivot rod 254 (see FIG. 14). As shown between FIGS. 15 and 16, the pivot action may be a full 180 degrees to turn the container 10 upside down. The container 10 may be returned to the load position 175 by moving the pivot rod 254 in the reverse direction or continuing with a 360-degree pivot of the handle about the central pivot point 250. In this configuration, a drop gate 122 may be opened automatically, due to the force of gravity, or operated manually. Alternative to using a drop gate, an operator may force a sliding gate open. In the example illustrated, no valve assembly 120 or gate valve is shown. In this example, the open container may be secured within the inner chamber 210 with an open top and rotated to release the product, under the force of gravity, through an aperture 112 of the dry feeder— enclosure arrangement. A lip of the inner chamber may engage a rim, rib, or surface of the container. The lip of the inner chamber may prevent the container 10 from falling out of the inner chamber 210 into the aperture 112 when in the dispense position 375. Alternatively, a strap or band connected to the pivot rod 254 may be secured around the container 10 to retain the container's position within the inner chamber 210.

Figure 17:
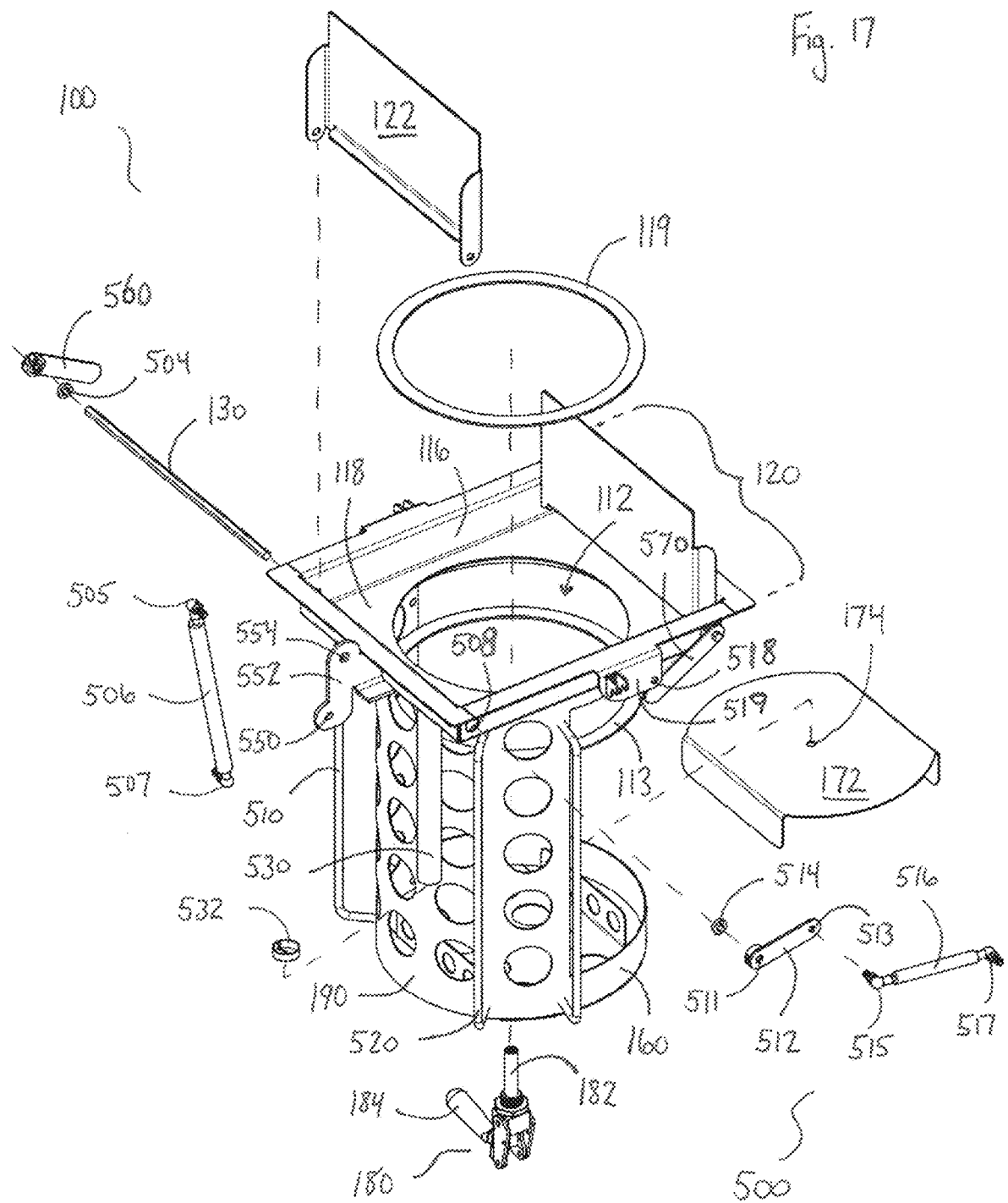
FIG. 17 shows an unassembled, exploded view of one dispensing mechanism from FIG. 2.

Referring now to FIG. 17, an exploded diagram is shown illustrating a side view of one dispensing mechanism 100 having a plurality of assist mechanisms. The valve actuator 130 (such as a metal rod/shaft) may be disposed through aperture 508. The aperture 508 may be disposed through the valve casing 116. An end of the valve actuator 130 may pass through the aperture 508 and be exposed towards an outside surface of the valve casing 116. The end of the valve actuator 130 may connect to an assist mechanism, such as a linkage 500.

The linkage 500, may serve as an actuating device for the valve actuator 130 to open and close the drop gate 122 of the valve assembly 120. The linkage 500 may include an assist actuator 506, 516. The assist actuator 506, 516 may serve as a structural element between the valve assembly 120 and the valve actuator 130. When activated, the assist actuator 506, 516 may assist the movement of the drop gate 122. Alternatively, the assist actuator 506, 516 may have ends that extend and retract. Extension and retraction of the assist actuator 506, 516 ends may be assisted by hydraulic or pneumatic means. Alternatively, the assist actuator 506, 516 ends may move by way of direct connection to a slide, leadscrew, worm screw, gears, magnetism, electricity/pneumatic supply, hydraulic supply, or other force supplying mechanism. In the example shown, a gas spring is used as the assist actuator 506, 516. The gas spring has a pivot end 507, 517 and a joint end 505, 515 that may extend or retract. The pivot end 507, 517 joins with aperture 518 disposed within bracket 509, 519. The bracket 509, 519 may be attached to the valve assembly 120. The bracket 509, 519 provides a structural support base to maintain a radial position of the gas spring. In the example shown, the joint end 505, 515 joins with a link 502, 512 of the linkage 500.

Figure 20:
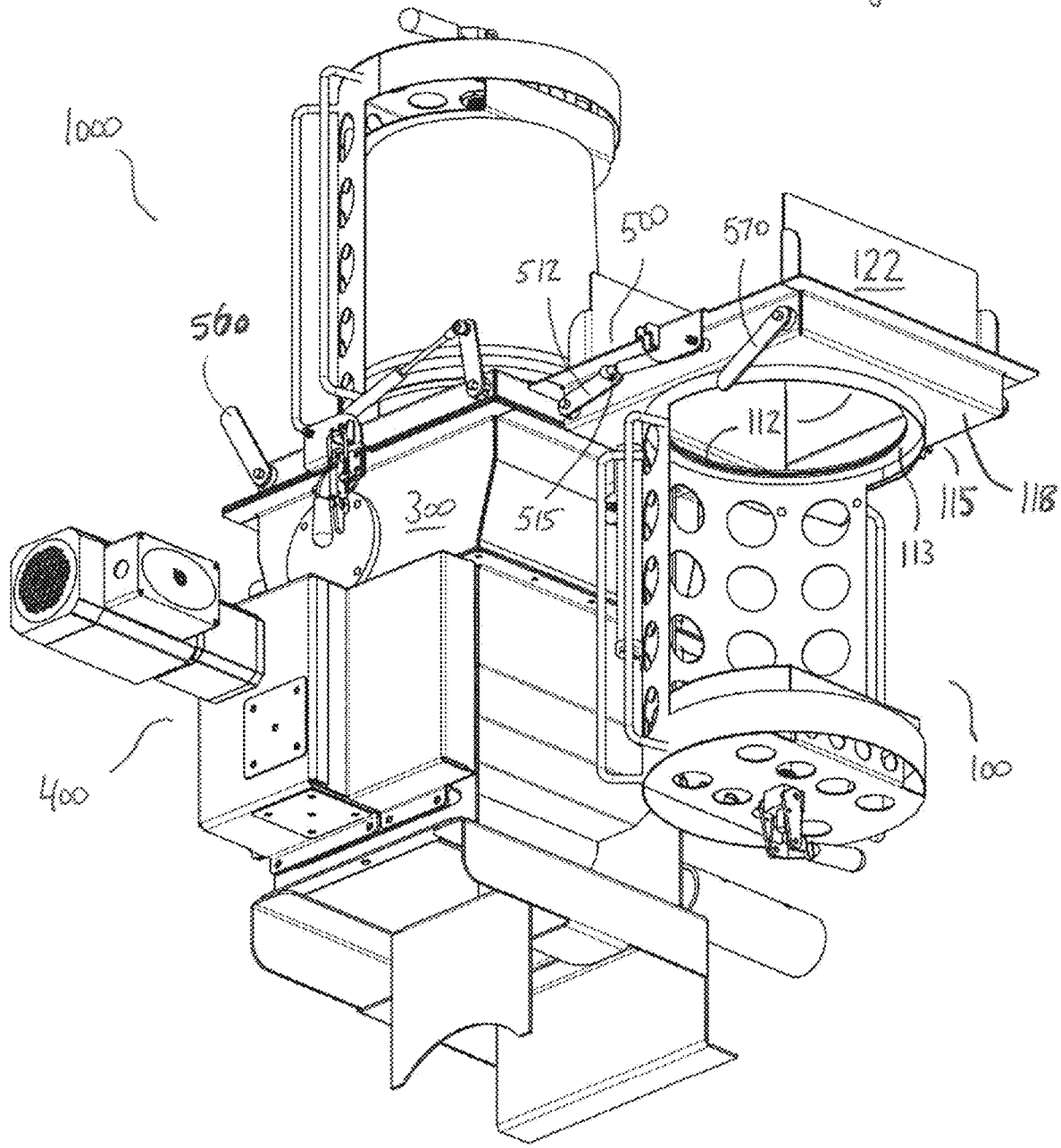
FIG. 20 shows a bottom-side perspective view of FIG. 19 with one container removed from a dispensing mechanism in the load position to show the opened valve.
Figure 21:
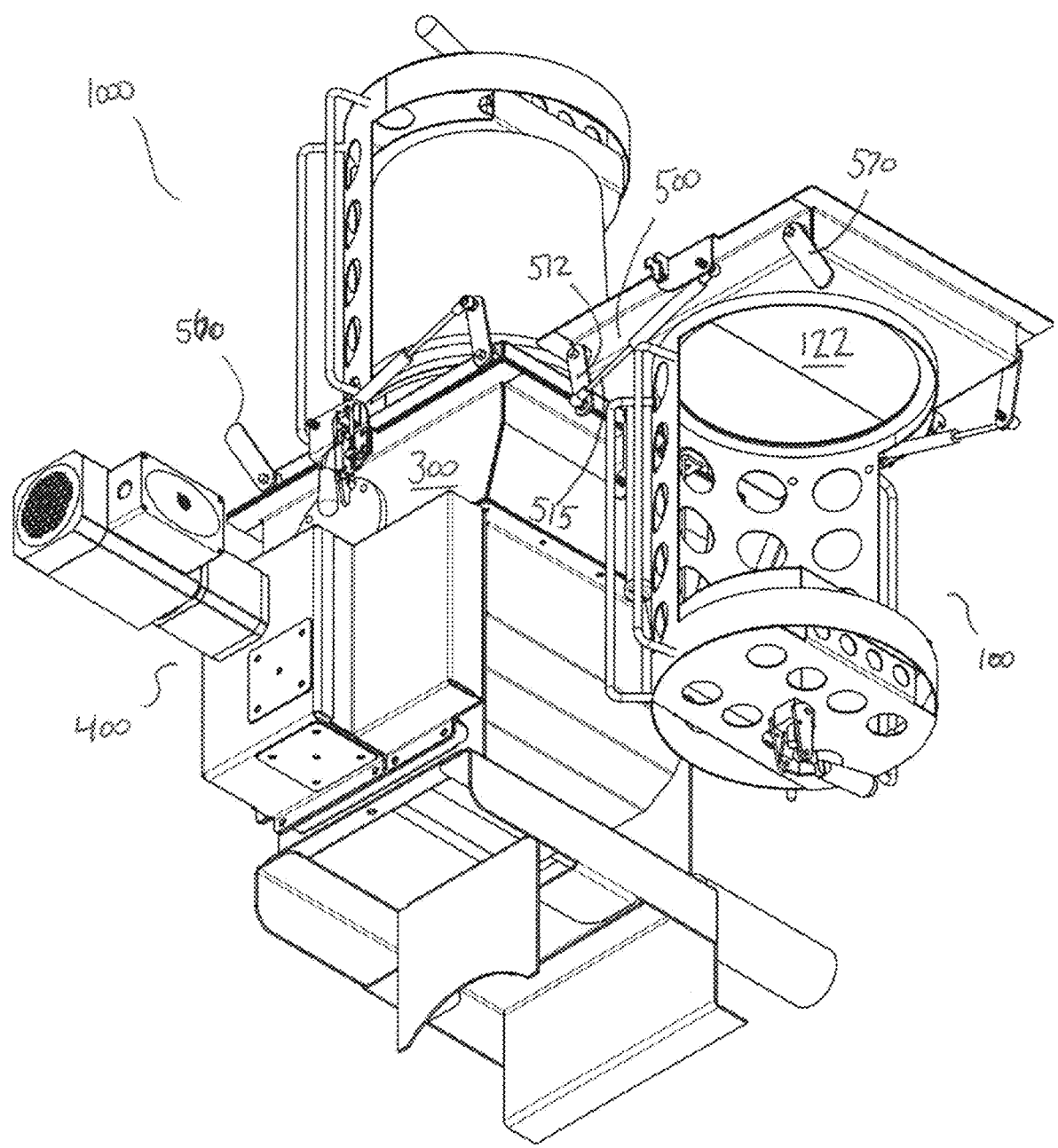
FIG. 21 shows the dispensing mechanism in the load position from FIG. 20 with a closed valve.

Still referring to FIG. 17, the linkage 500 provides an assembly of links and joints. The links and joints assist in providing an output motion to the drop gate 122 in response to an input motion by the assist mechanism. The link 502, 512 is used to provide leverage for rotation of the connected valve actuator 130 as shown in FIGS. 20 and 21. Sheet metal, or other substantially rigid material may be stamped or cut for manufacture of the link 502, 512. The link 502, 512 is a type of rigid, structural element. Two nodes may be disposed through the link 502, 512. The two nodes include a first node 511 that may couple with a shaft collar 504, 514 or an end of the actuator rod and a second node 513 for linking to the joint end 515 of the actuator 516. Alternatively, the end of the actuator rod may be disposed through the first node 511 of the link.

The linkage 500 may comprise a shaft collar 504, 514. The shaft collar 504, 514 may be slipped over an exposed end of the valve actuator 130 (actuator shaft). The shaft collar 504, 514 has an aperture with a diameter that may accommodate a diameter of the actuator rod. The shaft collar 504, 514 may be positioned between the valve casing and the link 502, 512. The shaft collar 504, 514 may serve as a type of clamp with the actuator rod. In this example, the shaft collar 504, 514 may couple or interlock with the link 502, 512. A shaft collar 504, 514 may clamp over a shaft of the valve actuator 130 and interlock with the link 502, 512 and a gate lever 560, 570. The shaft collar 504, 514 may rotate adjacently with a surface of the valve casing 116 or be disposed within the valve casing 116. In this example, the leverage applied to the linkage or gate lever coupled with a shaft collar transfers rotational movement to the valve actuator 130. Alternatively, fasteners, such as a threaded bolt, may be passed through the first node 511 of the link 512 and a node of the gate lever 560 for securing the valve actuator 130 therebetween. The fasteners may be used to secure the linkage 500 or gate lever to the ends of the actuator rod. In this example, the shaft collar 504, 514 may serve in supporting rotation of the actuator shaft and reduce friction between the valve casing 116 and the linkage 500 or gate lever. The shaft collar 504, 514 may also support an axial load. The shaft collar may serve as a particular type of washer or bearing, such as a rotary, thrust, or fluid film bearing.

Figure 18:
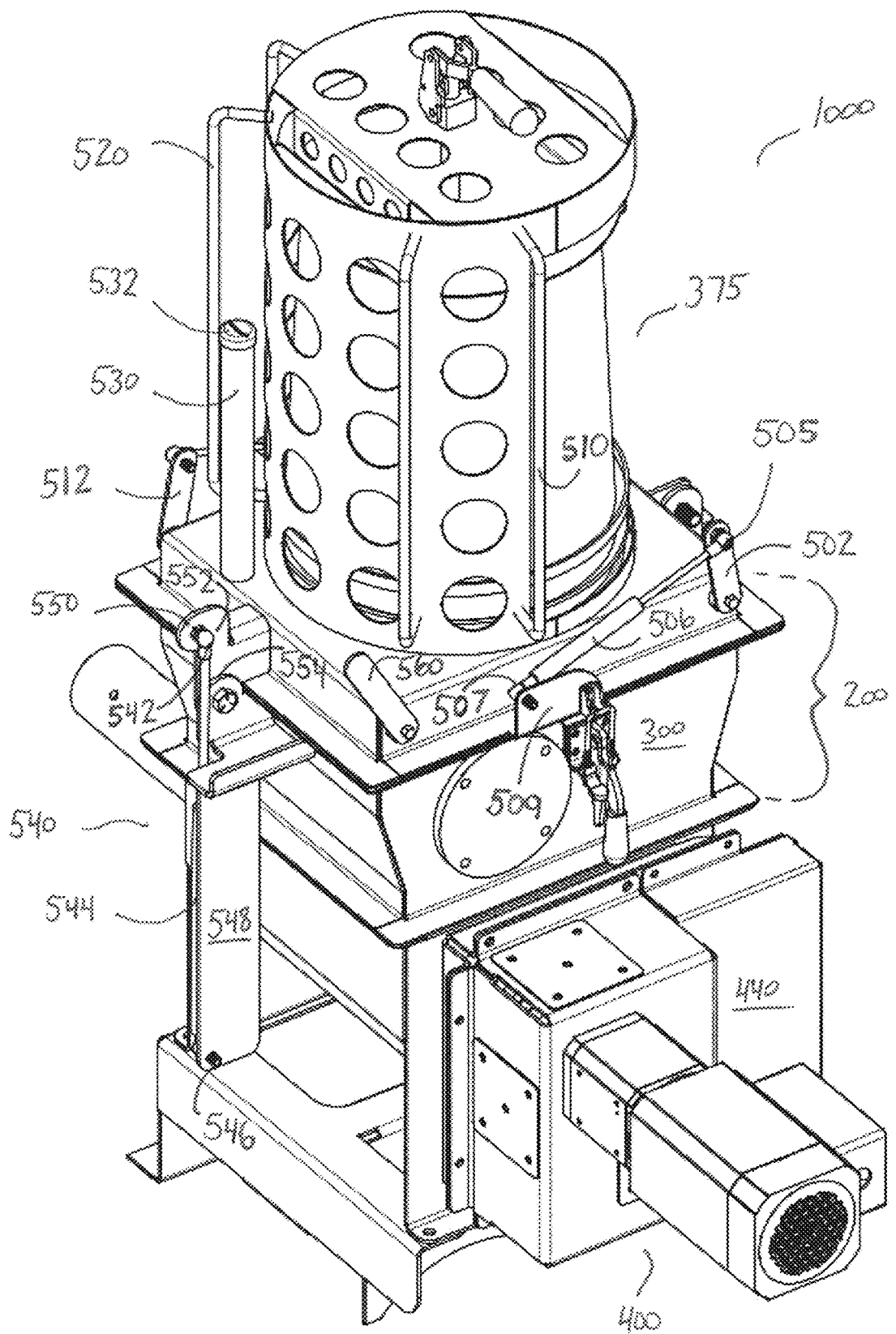
FIG. 18 shows a top-side perspective view of an assembled dispensing mechanism from FIG. 17 displaying an inversion assist mechanism.

As shown in FIG. 18, a plurality of handles may be attached to the dispensing mechanism 100. The handle 510, 520 may be secured to the structural member 190 to support a manually assisted dump of the dispensing mechanism. The handle 510, 520 may be made of tubular metal bent in a shape for attachment to the structural member 190 and handling by the operator. A second handle or set of handles may be secured to the valve casing of the valve assembly to support transitional movement of the dispensing mechanism to or from a manually assisted dump.

Figure 19:
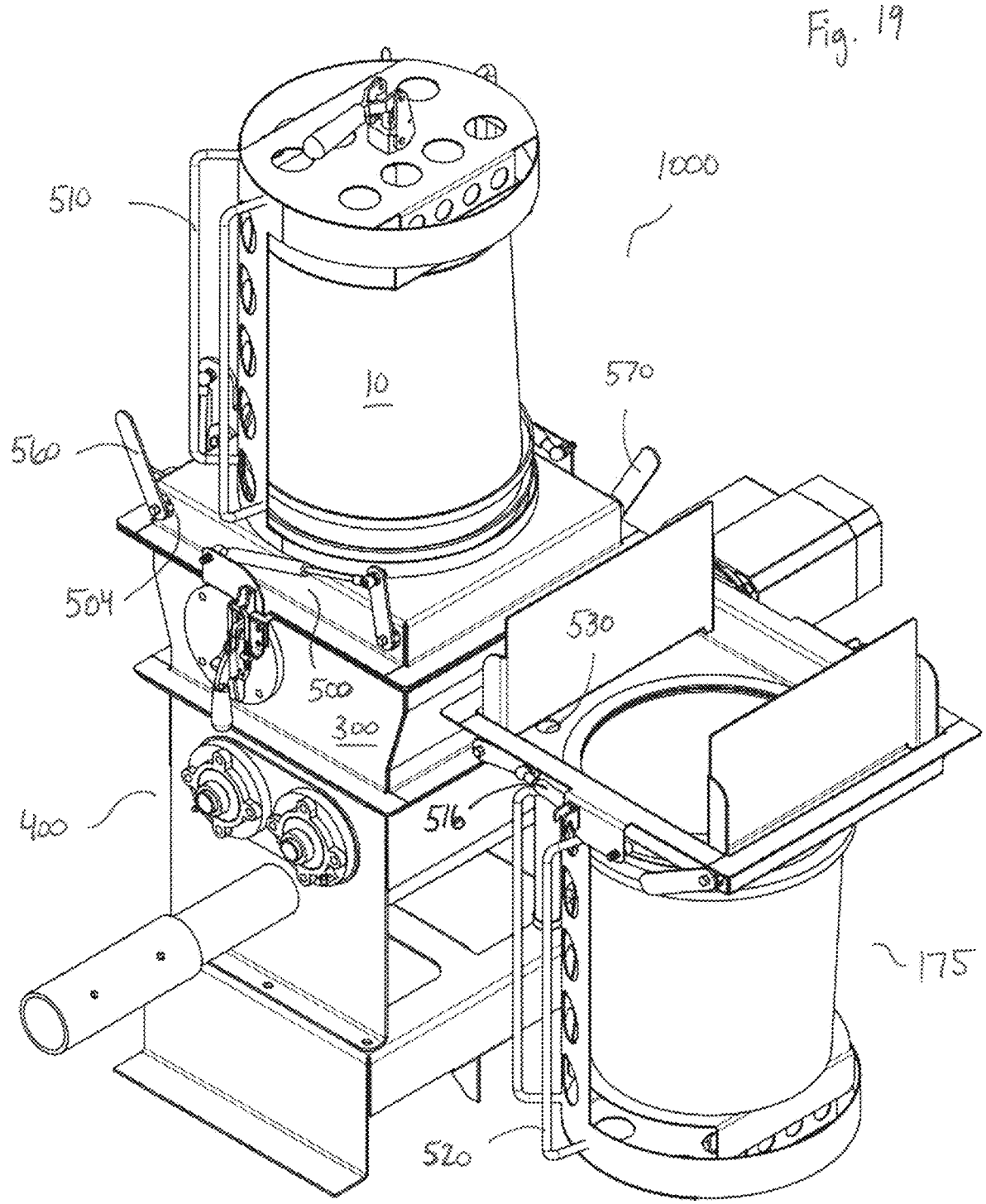
FIG. 19 shows a top-side perspective view of FIG. 2 with one dispensing mechanism in a dispense position and the other dispensing mechanism in a load position.

Optionally, a relief valve 530 may be disposed through the valve assembly or the enclosure 200 (shown in FIG. 19). The relief valve 530 may be used to equilibrate air pressures between an inside and outside space of the enclosure as the product is being released from the container 10 into the enclosure 200. This may allow a displacement of air from the inside of the enclosure 200 to the outside of the enclosure 200 as the product fills the space within the enclosure 200. The relief valve 530 may include a tube having a height based on a displacement height of product remaining within the container 10 when the enclosure 200 is at capacity. This may limit or prevent dispersal of a powdered dry product through the relief valve 530 when dispensed and mixed.

The relief valve 530 may also include a relief valve adjustment 532. The relief valve adjustment 532 may be used to dial in the amount of equilibration between the inside and outside air pressures of the enclosure 200. Alternatively, the amount the relief valve adjustment 532 is opened may be reduced or closed off to limit the amount of product dispersal from the enclosure 200 to the outside air space. In one example, the amount of relief provided is based on a height or length of a cylindrical body extension on the relief valve 530. More than one relief valve may be disposed through the valve assembly 120 to increase the rate at which equilibration occurs. Additionally, a relief valve may be disposed through a base end or sidewall of the container to equilibrate air pressure between an inside and outside space of the container.

FIG. 18 shows a version of an inversion assist mechanism 540. The inversion assist mechanism 540 may attached to a hinge bracket 552 and arranged between the dispensing mechanism 100 (shown in FIG. 17) and the hopper 300, when the dispensing mechanism 100 is in the loading position. The inversion assist mechanism 540 may be used to assist movement of the dispensing mechanism 100 between a load position 175 (see FIG. 19) and a dispense position 375. The inversion assist mechanism 540 may have an actuator 544. The actuator 544 may be a gas spring as previously discussed. A joint end 542 and a pivot end 546 may be disposed on opposite ends of the actuator 544. As shown in FIG. 18, the pivot end 546 is coupled to a structural support 548 and provides a base or foundation for the actuator 544. The structural support 548 may be stamped or cut from a sheet of metal or other material that is substantially rigid. The structural support 548 may extend downwardly from the hinge bracket 552 and arranged adjacently between the hopper 300 and a dispensing mechanism 100 in a load position. A fastener may be disposed through an aperture of the structural support 548 and the hinge pivot 554 of the hinge bracket 552. The joint end 542 is coupled to a hinge joint 550 of the hinge bracket 552. As shown in FIG. 18, the joint end 542 is extended. In the extended position, the joint end 542 pushes the dispensing mechanism 100 attached to the hinge bracket 552 into a dispense position 375. Upon retraction of the joint end 542, the dispensing mechanism 100 is pulled into a load position (partially shown in FIG. 22).

As shown in FIG. 19, a gate lever 560, 570 is shown for manual manipulation of each of the two equal halves of the drop gate 122. Sheet metal, or other substantially rigid material may be stamped or cut for manufacture of the gate lever 560, 570. The gate lever 560, 570 may be a type of rigid, structural element possessing at least one node. A fastener, such as a threaded bolt or screw, may be passed through the node of the gate lever 560, 570 to secure the gate lever to the actuator rod. The fastener may serve as a fulcrum transferring leverage applied to the handle of the gate lever by an operator into rotational movement of the connected actuator rod. Alternatively, the gate lever 560, 570 may couple with a shaft collar 504, 514. The shaft collar 504, 514 may serve as a shaft clamp that can interlock with the shaft of the actuator rod.

Now referring to FIG. 20, an unloaded dispensing mechanism 100 is seen from a side-below perspective showing the aperture 112 in an open position. As shown in FIG. 20, the rim seat 113 disposed on the first side 115 of the valve assembly is more clearly seen. A comparison between the figures shows the movement of the linkage 500 and drop gate valve. The drop gate valve is moved into the open and closed positions by actuation of an assist actuator 506, 516 (shown in FIGS. 18 and 19). Movement of the drop gate halves is assisted by retraction and extension of the assist actuator ends of the gas springs. In retraction mode, the joint end 515 pulls the link 512 into a horizontal orientation. Movement of the link 512 into the horizontal orientation rotates the attached actuator rod and gate lever 560. The link 512 and the gate lever 560 are generally with and adjacent to a surface of the valve casing and perpendicular with the drop gate that is open. In extension mode, the joint end 515 pushes the link 512 rotating the attached actuator rod and gate lever 560. The link 512 and the gate lever 560 generally align along an axis (α) (shown in FIGS. 4 and 6) parallel with the height of the container 10 and perpendicular to the drop gate 122 that is closed.

As shown in FIG. 20, the joint end 515 of the actuator 516 is shown in a retracted position. The joint end 515 is connected to a second node 513 of the link 512 (shown in FIG. 17). In the retracted position, the joint end 515 connected to the second node 513 pulls the link 512 into a generally horizontal position. A first node 511 of the link 512 (shown in FIG. 17) is connected to one end of a first actuator rod. The movement by the link 512 into the horizontal position rotates the first actuator rod in a counterclockwise fashion (as seen from this perspective). The first drop gate may be connected to the first actuator rod by a first bracket. A first leading edge of the first drop gate swings with a similar counterclockwise rotation upon retraction of the joint end 515. The rotating first actuator rod swings the first drop gate an approximate 90-degrees from a closed position (see FIG. 21) to an open position. A second drop gate—an equal half of the drop gate 122—may be opened upon actuation of a second linkage. The first assist actuator 506 may be similar to a second assist actuator 516 in its linkage configuration with the valve assembly 120. On an opposite side of the valve assembly (see FIG. 17), a gate lever 560 may be connected to an opposite end of the first actuator rod. An addition of an extension on the gate lever 560 may prevent pinching of an operator's hands when operating actuation of the valve manually.

In FIG. 21, the unloaded dispensing mechanism 100 of FIG. 20 is shown with the aperture 112 in a closed position. As shown in FIG. 21, the joint end 515 of the actuator 516 is in an extended position. In the extended position, the joint end 515 connected to the second node 513 pushes the link 512 into a generally perpendicular position. Movement by the link 512 into the perpendicular position rotates the first actuator rod in a clockwise fashion (as seen from this perspective). The first leading edge of the first drop gate swings with a similar clockwise rotation upon extension of the joint end 515. The rotating first actuator rod swings the first drop gate an approximate 90-degrees from an open position (see FIG. 20) to a closed position. The second drop gate may be closed upon actuation of the second linkage. Alternatively, a distal end of the gate lever 560, 570 may be manually rotated by an operator to initiate movement of the actuator rod and drop gate.

Referring to FIGS. 22, 23, and 24, a plurality of inversion assist mechanisms are shown connected to the hopper-container dispensing mechanism 1000. When viewed comparatively in order, FIGS. 22, 23, and 24 show a dispensing mechanism 100 in a sealed position 275, moving away from a load position towards a dispense position 375. Complete inversion of the container occurs when moved by the dispensing mechanism 100 from the load position to the dispense position 375. A full dispense of the power product(s) within the container is permitted during the inversion. When viewed comparatively in reverse order, FIGS. 24, 23, and 22 show a dispensing mechanism 100 in a sealed position 275, moving from a dispense position 375 towards a load position. The dispensing mechanism 100 mounted unobtrusively to the side of the hopper provides an operator with unobstructed access to the hopper-container dispensing mechanism 1000 and surrounding equipment. As shown by the preceding figures, the drop gate 122 (see FIG. 21) is closed as indicated by extension of the actuator 544.

Figure 25:
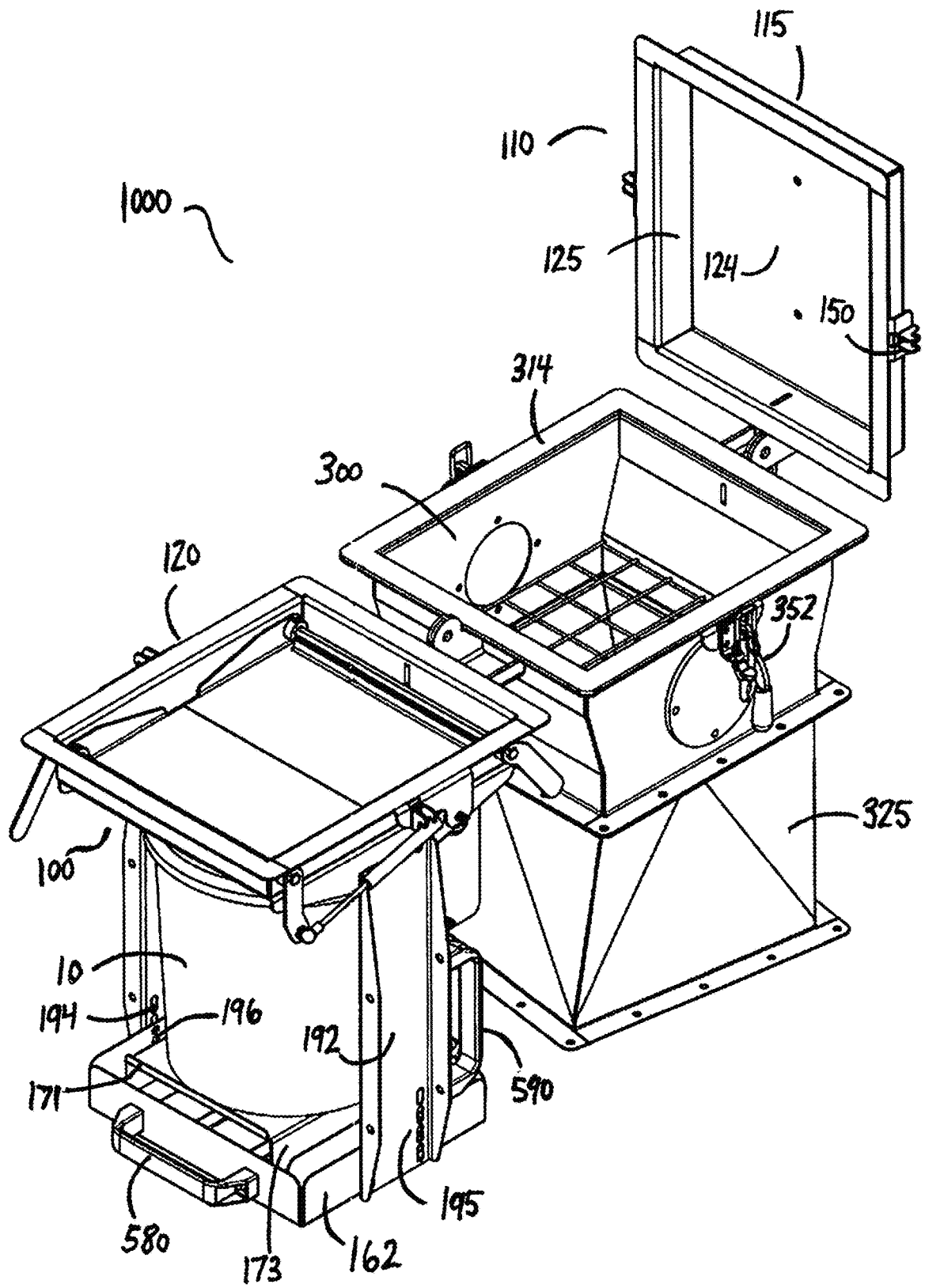
FIG. 25 shows a top-side perspective view of one version of a hopper-container arrangement displaying the pin and slot mechanism on the structural member.

The opened end of a container can be sealed with a first side of the valve assembly of the dispensing mechanism. The second side of the valve assembly can be joined with a dry additive feed mixer, with or without a transition element 325. A transition element 325 may be placed on the hopper 300 to serve as a joining element between the hopper 300 and the dispensing mechanism 100. Alternatively, or in addition, a transition element 325 may be placed on the dry additive feeder 400 to serve as a joining element between the hopper 300 and the dry additive feeder 400. In either arrangement, the transition element 325 may provide extra product holding capacity for one or more container volumes when extra dumps are made. As shown in FIG. 25, the transition element 325 is positioned to serve as a joining element between the hopper 300 and the dry feeder (not shown). The transition element 325 comprises a twist of rotation about a central axis along the height of the transition element 325. One end of the transition element 325 may have a twist of rotation between 10 degrees to 30 degrees from the other end. In the example shown, the transition element 325 has a 20-degree twist which may aid in movement of the fluent material dispensed through the hopper 300.

The hopper-container dispensing mechanism 1000 of FIG. 25 shows one version of a dispensing mechanism 100 with several optional features. One feature highlighted is a structural member 192 that may connect between the valve assembly 120 and the base member 162 with a bolt on design. As shown, a first slot 194 or a plurality of slots may be disposed through the structural members. A first pin 196 or bolt may be passed through an aperture in the base member 162 and the structural member 190 to secure a displacement distance between the base member 162 and the valve assembly 120. As previously mentioned, a pin and slot mechanism 195 allows for vertical adjustment of the structural member 192 to accommodate a selected displacement distance in accordance with the height of a container 10 selected. The structural member 192 and a product stand 173 that is square in shape can also accommodate a square container due to the extra space allowed by the design. Another feature is a lip 171 extending upward from an edge of the product stand 173. The lip 171 of the product stand 173 retains and prevents sliding of the container 10. A different version of the handle assists is shown in FIG. 25. A horizontal handle 580 and a vertical handle 590 may be bolted on to the base member 162 and the structural member 192, respectively. Optionally, a lid 110 may replace one of the dispensing mechanisms to prevent dusting of the environment. The lid 110 may be pivoted to form an enclosure with the hopper 300 when the dispensing mechanism 100 is in the load position.

A dry additive may be dispensed from an open container to a hopper with the following method. First, sealing, or pinching, a dispense end of an open container to a valve assembly of the dispensing mechanism. Then rotating, or flipping, the dispensing mechanism and the container together from load position to a dispense position. Upon flipping, the dispense end and a base end of the container are inverted while the container is maintained in a sealed state. Then, joining the valve assembly with an open end of an open hopper. Then opening a valve to dispense a product from the container through a valve aperture of the valve assembly into the open hopper of a dry additive feed mixer. Optionally, a second container may be loaded into an engagement device of a second dispensing mechanism. The second dispensing mechanism and second container may be rotated, or flipped, from a load position to a dispense position. Alternatively, the first dispensing mechanism and second dispensing mechanism may be arranged such that the two dispensing mechanisms can be moved to the dispense position for simultaneous dumping of the contents from both the first container and the second container.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

We claim:

1. A hopper-container dispensing mechanism comprising:
   a. a hopper;
   b. a valve assembly pivotally mounted to the hopper;
   c. an engagement device configured to receive a container, the engagement device comprising:
      i. a stand;
      ii. a base member;
   d. an actuator mounted to the stand, the actuator operable to move the stand relative to the base member between a load position and a sealed position; and
   e. wherein pivoting the valve assembly upon the hopper moves the valve assembly, the stand, the base member, and the actuator between the load position and a dispense position.

2. The hopper-container dispensing mechanism of claim 1, further comprising:
   a. an actuator rod extending between the actuator and the stand through the base member.

3. The hopper-container dispensing mechanism of claim 1, wherein the valve assembly pivotally mounted to the hopper is configured to move 180 degrees relative to the hopper between the load position, where the valve assembly is adjacent to the hopper, and the dispense position, where the valve assembly is above the hopper.

4. The hopper-container dispensing mechanism of claim 1, wherein the valve assembly comprises:
   a. a flange that abuts the hopper in the dispense position to form an enclosure.

5. The hopper-container dispensing mechanism of claim 4 further comprising:
   a. a clamp that secures the enclosure formed by the flange that abuts the hopper.

6. The hopper-container dispensing mechanism of claim 1, wherein the valve assembly comprises:
   a. a valve configured to close and open an aperture; and
   b. wherein the valve is approximately equal in width to a rim of the container received by the stand.

7. The hopper-container dispensing mechanism of claim 6, wherein a gasket forms a seal between the valve and the rim of the container in the sealed position.

8. A hopper-container dispensing mechanism comprising:
a. a hopper;
b. a valve assembly comprising:
   i. a valve operable to close and open an aperture;
   ii. a sealing member disposed within the valve assembly and configured to abut the valve that is closed;
c. an engagement device configured to abut a container against the sealing member;
d. wherein the valve assembly and the sealing member are movable between:
   i. a load position, where the valve assembly operates as a lid for the container and the sealing member is adjacent to the hopper; and
   ii. a dispense position, where the valve assembly operates as a lid for the hopper and the sealing member is above the hopper.

9. The hopper-container dispensing mechanism of claim 8, wherein the sealing member is disposed above the container in the load position and disposed below the container in the dispense position.

10. The hopper-container dispensing mechanism of claim 8, wherein the valve assembly comprises:
a. a rim seat disposed along a perimeter of the aperture within the valve assembly; and
b. wherein the valve is seated below the rim seat in the dispense position and above the rim seat in the load position.

11. The hopper-container dispensing mechanism of claim 8 further comprising:
a. a rim seat; and
b. wherein the sealing member is disposed above the rim seat in the load position and disposed between the rim seat and the hopper in the dispense position.

12. A hopper-container dispensing mechanism comprising:
a. a hopper;
b. a valve assembly comprising:
   i. a valve operable to close and open an aperture;
   ii. a sealing member disposed within the valve assembly and configured to abut the valve that is closed;
   iii. a valve casing comprising:
      1. A flange disposed at a perimeter of the valve casing;
c. an engagement device configured to abut a container against the sealing member;
d. wherein the valve assembly is movable between:
   i. a load position, where the valve assembly operates as a lid for the container;
   ii. a dispense position, where the valve assembly operates as a lid for the hopper; and
   iii. wherein the flange forms an enclosure with the hopper in the dispense position.

13. A hopper-container dispensing mechanism of claim 8, comprising:
a. a hopper;
b. a valve assembly comprising:
   i. a valve operable to close and open an aperture;
   ii. a sealing member disposed within the valve assembly and configured to abut the valve that is closed;
c. an engagement device configured to abut a container against the sealing member;
d. wherein the valve assembly is movable between:
   i. a load position, where the valve assembly operates as a lid for the container;
   ii. a dispense position, where the valve assembly operates as a lid for the hopper; and
e. a clamp that secures the valve assembly in the dispense position.

14. A hopper-container dispensing mechanism comprising:
a. a hopper;
b. a valve assembly comprising:
   i. a valve operable to close and open an aperture;
   ii. a sealing member disposed within the valve assembly and configured to abut the valve that is closed;
   iii. wherein the valve assembly is pivotally mounted to the hopper;
c. an engagement device configured to abut a container against the sealing member;
d. wherein the valve assembly is movable between:
   i. a load position, where the valve assembly operates as a lid for the container; and
   ii. a dispense position, where the valve assembly operates as a lid for the hopper.

15. The hopper-container dispensing mechanism of claim 14, further comprising:
a. a hinge attached between the valve assembly and the hopper, the hinge operable to pivot the valve assembly and the container a full 180 degrees between the load position and the dispense position.

16. The hopper-container dispensing mechanism of claim 15, wherein a plurality of valve assemblies are made operable with the hopper and movable between the load position and the dispense position.

17. The hopper-container dispensing mechanism of claim 8, wherein the engagement device further comprises:
a. a base member; and
b. a stand, wherein an actuator mounted to the stand is operable to move the stand relative to the base member between the load position and a sealed position.

18. The hopper-container dispensing mechanism of claim 17, wherein pivoting the valve assembly upon the hopper moves the valve assembly, the stand, the base member, and the actuator between the load position and the dispense position.

19. The hopper-container dispensing mechanism of claim 8, further comprising:
a. an actuator mounted to the engagement device, the actuator operable to move the container between an unsealed position and a sealed position.

20. The hopper-container dispensing mechanism of claim 8, further comprising:
a. a hinge attached between the valve assembly and the hopper, the hinge operable to pivot the valve assembly and the container between the load position and the dispense position.

* * * * *